US009213405B2

(12) United States Patent
Perez et al.

(10) Patent No.: US 9,213,405 B2
(45) Date of Patent: Dec. 15, 2015

(54) COMPREHENSION AND INTENT-BASED CONTENT FOR AUGMENTED REALITY DISPLAYS

(75) Inventors: Katie Stone Perez, Kirkland, WA (US); Avi Bar-Zeev, Redmond, WA (US); Sagi Katz, Yokneam Ilit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 12/970,695

(22) Filed: Dec. 16, 2010

(65) Prior Publication Data

US 2012/0154557 A1 Jun. 21, 2012

(51) Int. Cl.
*H04N 9/47* (2006.01)
*H04N 13/04* (2006.01)
*G06F 3/01* (2006.01)
*G02B 27/01* (2006.01)
(Continued)

(52) U.S. Cl.
CPC .............. *G06F 3/013* (2013.01); *G02B 27/017* (2013.01); *G06F 3/017* (2013.01); *H04N 21/25891* (2013.01); *H04N 21/4725* (2013.01); *H04N 21/47205* (2013.01); *G02B 2027/014* (2013.01); *G02B 2027/0178* (2013.01); *G02B 2027/0187* (2013.01)

(58) Field of Classification Search
CPC .................. G02B 2027/014; G02B 2027/0178; G02B 2027/0187; G02B 27/017; G06F 3/013; G06F 3/017; H04N 21/25891; H04N 21/47205; H04N 21/4725
USPC ..................................... 348/53; 345/419, 423
See application file for complete search history.

(56) References Cited

U.S. PATENT DOCUMENTS 4,934,773 A 6/1990 Becker
5,016,282 A 5/1991 Tomono et al.
(Continued)

FOREIGN PATENT DOCUMENTS

CN 101026776 A 8/2007
WO 2005124429 A1 12/2005
(Continued)

OTHER PUBLICATIONS

Ajanki, et al. "Contextual Information Access with Augmented Reality." In Proceedings of IEEE International Workshop on Machine Learning for Signal Processing (MLSP), Aug. 29-Sep. 1, 2010, pp. 95-100: Kittilä, Finland.
(Continued)

*Primary Examiner* — Anner Holder
(74) *Attorney, Agent, or Firm* — Micah Goldsmith; Judy Yee; Micky Minhas

(57) ABSTRACT

A method and system that enhances a user's experience when using a near eye display device, such as a see-through display device or a head mounted display device is provided. The user's intent to interact with one or more objects in the scene is determined. An optimized image is generated for the user based on the user's intent. The optimized image is displayed to the user, via the see-through display device. The optimized image visually enhances the appearance of objects that the user intends to interact with in the scene and diminishes the appearance of objects that the user does not intend to interact with in the scene. The optimized image can visually enhance the appearance of the objects that increase the user's comprehension. The optimized image is displayed to the user, via the see-through display device.

20 Claims, 22 Drawing Sheets

(51) Int. Cl.
  *H04N 21/258* (2011.01)
  *H04N 21/472* (2011.01)
  *H04N 21/4725* (2011.01)

(56) References Cited

U.S. PATENT DOCUMENTS

| | | | |
|---|---|---|---|
| 5,307,170 A | 4/1994 | Itsumi et al. | |
| 5,471,542 A | 11/1995 | Ragland | |
| 5,486,860 A | 1/1996 | Shiokawa et al. | |
| 5,689,619 A | 11/1997 | Smyth | |
| 6,046,712 A | 4/2000 | Beller et al. | |
| 6,053,610 A | 4/2000 | Kurtin et al. | |
| 6,069,742 A | 5/2000 | Silver | |
| 6,351,335 B1 | 2/2002 | Perlin | |
| 6,433,760 B1 | 8/2002 | Vaissie et al. | |
| 6,456,262 B1 | 9/2002 | Bell | |
| 6,466,207 B1 | 10/2002 | Gortler et al. | |
| 6,522,479 B2 | 2/2003 | Yahagi | |
| 6,578,962 B1 | 6/2003 | Amir et al. | |
| 6,597,346 B1 | 7/2003 | Havey et al. | |
| 6,618,208 B1 | 9/2003 | Silver | |
| 6,659,611 B2 | 12/2003 | Amir et al. | |
| 6,711,414 B1 | 3/2004 | Lightman et al. | |
| 6,738,040 B2 | 5/2004 | Jahn et al. | |
| 6,760,046 B2 | 7/2004 | I'Anson et al. | |
| 6,886,137 B2 | 4/2005 | Peck et al. | |
| 6,975,991 B2 | 12/2005 | Basson et al. | |
| 7,130,447 B2 | 10/2006 | Aughey et al. | |
| 7,133,077 B2 | 11/2006 | Higuma et al. | |
| 7,137,069 B2 | 11/2006 | Abbott et al. | |
| 7,262,926 B2 | 8/2007 | Ohsato | |
| 7,362,522 B2 | 4/2008 | Ohsato | |
| 7,391,887 B2 | 6/2008 | Durnell | |
| 7,396,129 B2 | 7/2008 | Endrikhovski et al. | |
| 7,401,300 B2 | 7/2008 | Nurmi | |
| 7,401,920 B1 | 7/2008 | Kranz et al. | |
| 7,457,434 B2 | 11/2008 | Azar | |
| 7,493,153 B2 | 2/2009 | Ahmed et al. | |
| 7,522,344 B1 | 4/2009 | Curatu et al. | |
| 7,532,230 B2 | 5/2009 | Culbertson et al. | |
| 7,533,988 B2 | 5/2009 | Ebisawa | |
| 7,542,210 B2 | 6/2009 | Chirieleison, Sr. | |
| 7,686,451 B2 | 3/2010 | Cleveland | |
| 7,736,000 B2 | 6/2010 | Enriquez et al. | |
| 7,805,528 B2 | 9/2010 | Park et al. | |
| 7,822,607 B2 | 10/2010 | Aoki et al. | |
| 7,948,451 B2 | 5/2011 | Gustafsson et al. | |
| 8,184,070 B1 | 5/2012 | Taubman | |
| 8,209,183 B1 | 6/2012 | Patel et al. | |
| 8,223,088 B1 | 7/2012 | Gomez et al. | |
| 2002/0158873 A1 | 10/2002 | Williamson | |
| 2004/0008157 A1 | 1/2004 | Brubaker et al. | |
| 2004/0239670 A1 | 12/2004 | Marks | |
| 2005/0047629 A1 | 3/2005 | Farrell et al. | |
| 2005/0206583 A1 | 9/2005 | Lemelson et al. | |
| 2006/0007308 A1 | 1/2006 | Ide et al. | |
| 2006/0146012 A1 | 7/2006 | Arneson et al. | |
| 2007/0081726 A1 | 4/2007 | Westerman | |
| 2007/0167689 A1 | 7/2007 | Ramadas et al. | |
| 2008/0002262 A1 | 1/2008 | Chirieleison | |
| 2008/0007689 A1 | 1/2008 | Silver | |
| 2008/0024392 A1* | 1/2008 | Gustafsson et al. | 345/8 |
| 2008/0024597 A1 | 1/2008 | Yang et al. | |
| 2008/0084532 A1 | 4/2008 | Kurtin | |
| 2008/0117289 A1 | 5/2008 | Schowengerdt et al. | |
| 2008/0133336 A1 | 6/2008 | Altman et al. | |
| 2008/0158096 A1 | 7/2008 | Breed | |
| 2008/0181452 A1 | 7/2008 | Kwon et al. | |
| 2008/0195956 A1 | 8/2008 | Baron | |
| 2009/0005961 A1 | 1/2009 | Grabowski et al. | |
| 2009/0055739 A1 | 2/2009 | Murillo et al. | |
| 2009/0174946 A1 | 7/2009 | Raviv et al. | |
| 2009/0189974 A1 | 7/2009 | Deering | |
| 2009/0221368 A1 | 9/2009 | Yen et al. | |
| 2009/0225001 A1 | 9/2009 | Biocca et al. | |
| 2009/0243968 A1 | 10/2009 | Nakazawa | |
| 2009/0284608 A1 | 11/2009 | Hong et al. | |
| 2009/0286570 A1 | 11/2009 | Pierce | |
| 2010/0017728 A1* | 1/2010 | Cho et al. | 715/757 |
| 2010/0079356 A1 | 4/2010 | Hoellwarth | |
| 2010/0197399 A1 | 8/2010 | Geiss | |
| 2010/0231706 A1 | 9/2010 | Maguire, Jr. | |
| 2010/0238161 A1* | 9/2010 | Varga et al. | 345/419 |
| 2010/0257252 A1 | 10/2010 | Dougherty et al. | |
| 2010/0303289 A1 | 12/2010 | Polzin | |
| 2011/0022196 A1 | 1/2011 | Linsky et al. | |
| 2011/0188760 A1 | 8/2011 | Wright et al. | |
| 2011/0219291 A1* | 9/2011 | Lisa | 715/207 |
| 2011/0221656 A1 | 9/2011 | Haddick et al. | |
| 2011/0292076 A1 | 12/2011 | Wither et al. | |
| 2012/0021828 A1 | 1/2012 | Raitt et al. | |
| 2012/0079018 A1 | 3/2012 | Rottler et al. | |
| 2012/0105486 A1 | 5/2012 | Lankford et al. | |
| 2012/0127062 A1 | 5/2012 | Bar-Zeev et al. | |
| 2012/0143361 A1 | 6/2012 | Kurabayashi et al. | |
| 2013/0107021 A1 | 5/2013 | Maizels et al. | |

FOREIGN PATENT DOCUMENTS

| | | | |
|---|---|---|---|
| WO | 2007066166 A1 | 6/2007 | |
| WO | 2007085303 A1 | 8/2007 | |

OTHER PUBLICATIONS

Barras, Colin. "Innovation: Gaze trackers eye computer garners." NewScientist [online]. Mar. 26, 2010. Retrieved from the Internet on Aug. 26, 2010: URL: <http://www.newscientist.com/article/dn18707-innovation-gaze-trackers-e>. Four pages.

"Gaze-enhanced User Interface Design." Stanford HCI Group [online]. Retrieved from the Internet on Aug. 27, 2010: URL: <http://hci.stanford.edu/research/GUIDe/>.

Kemp, Miles. "Augmented Reality Glasses Concept by Nokia." Spatial Robots [online]. Sep. 23, 2009. Retrieved from the Internet on Aug. 26, 2010: URL: <http://www.spatialrobots.com/2009/09/augmented-reality-glasses-concept-by-nokia/>. Six pages.

Nilsson, Susanna, Torbjorn Gustafsson and Per Carleberg. "Hands Free Interaction with Virtual Information in a Real Environment: Eye Gaze as an Interaction Tool in an Augmented Reality System." PsychNology Journal, vol. 7, No. 2, pp. 175-196, Apr. 28, 2009.

"Nokia Has Been Fine-Tuning Eye-Tracking Glasses." Symbian-Guru.com [online], Sep. 6, 2009. Retrieved from the Internet on Aug. 26, 2010: URL: <http://www.symbian-guru.com/welcome/2009/09/nokia-has-been-fine-tuning-eye-tracking-glasses.html>. Three pages.

"Visual perception." Wikipedia [online]. Retrieved from the Internet on Aug. 26, 2010: URL: <http://en.wikipedia.org/wiki/Visual_perception>. Six pages.

U.S. Appl. No. 13/221,770, filed Aug. 30, 2011.

Bier et al., "Toolglass and Magic Lenses: The See-Through Interface," Proceedings of the 20th Annual Conference and Exhibition on Computer Graphics and Interactive Techniques (SIGGRAPH '93), Aug. 2-6, 1993, Anaheim, California, USA, 17 pages.

Peters, Brandon, "Pupil Size Can Objectively Identify Sleepiness, Sleep Deprivation," Pupillometry Often Used in Research Setting, About.com [online], Mar. 25, 2010 [retrieved on Aug. 9, 2011], Retrieved from the Internet: <URL: http://sleepdisorders.about.com/od/doihaveasleepdisorder/qt/Pupil_Size.htm>, 1 page.

Partala, et al., "Pupil size variation as an indication of affective processing," International Journal of Human-Computer Studies, Jul. 2003, vol. 59, Issue 1-2, pp. 185-198, Academic Press, Inc., Duluth, MN, USA, 14 pages.

Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.

Selker, "Visual Attentive Interfaces,"—Published Date: Oct. 2004, BT Technology Journal, http://web.media.mit.edu/~walter/bttj/Paper16Pages146-150.pdf.

Guan, "Real-Time 3D Pointing Gesture Recognition for Natural HCI,"—Published Date: Jun. 25-27, 2008 http://ieeexplore.ieee.org/stamp/stamp.jsp?tp=&arnumber=4593304.

(56) References Cited

OTHER PUBLICATIONS

Gade, "Person Localization in a Wearable Camera Platform towards Assistive Technology for Social Interactions,"—Retrieved Date: May 5, 2011, http://www.ubicc.org/files/pdf/7_424.pdf.

Depalma, "Leveraging Online Virtual Agents to Crowdsource Human-Robot Interaction,"—Retrieved Date: May 5, 2011, http://crowdresearch.org/blog/?p=68.

U.S. Appl. No. 13/212,172, filed Aug. 17, 2011.

U.S. Appl. No. 13/216,647, filed Aug. 24, 2011.

Akeley et al., "A Stereo Display Prototype with Multiple Focal Distances", Proceedings of ACM SIGGRAPH, Aug. 2004, pp. 804-813. ACM, Inc., New York, NY, USA, 10 pages.

Blum, et al., "The Effect of Out-of-focus Blur on Visual Discomfort When Using Stereo Displays", Proceedings of the 2010 International Symposium on Mixed and Augmented Reality, Oct. 13-16, 2010, pp. 13-17, IEEE: Seoul, Korea, 5 pages.

Chen et al., "Research on Eye-gaze Tracking Network Generated by Augmented Reality Application", Proceedings of the Second International Workshop on Knowledge Discovery and Data Mining, Jan. 23-25, 2009, pp. 594-597 IEEE, Moscow, Russia, 4 pages.

"Helmet Mounted Display (HMD) with Built-In Eye Tracker", Datasheet, National Aerospace Laboratory (NLR), Jan. 2009, Retrieved from the Internet: URL: <http://www.nlr.nl/ATTS/flyer%20HMD%20F294-03.pdf>, 4 pages.

Hillaire, et al., "Using an Eye-Tracking System to Improve Camera Motions and Depth-of-Field Blur Effects in Virtual Environments", Proceedings of the 2008 Virtual Reality Conference, Mar. 8-12, 2008, pp. 47-50, IEEE: Reno, NE, USA. Retrieved from the Internet Nov. 11, 2010, URL: <http://www.irisa.fr/bunraku/GENS/alecuyer/vr08_hillaire.pdf>, 4 pages.

Johnson, Joel, "How Oil-Filled Lenses are Bringing Sight to Those in Need", Gizmodo [online], Feb. 3, 2010 [retrieved on Nov. 11, 2010], Gawker Media, New York, NY, USA, Retrieved from the Internet, URL: <http://gizmodo.com/5463368/how-oil+filled-lenses-are-bringing-sight-to-those-in-need> 4 pages.

Kim et al., "Vision-Based Eye-Gaze Tracking for Human Computer Interface", Proceedings of the 1999 Conference on Systems, Man, and Cybernetics, Oct. 12-15, 1999, pp. 324-329, vol. 2. IEEE: Toyko, Japan, 3 pages.

Lee et al., "Robust Gaze Tracking Method for Stereoscopic Virtual Reality Systems", J. Jacko (Ed.). Proceedings of the 12th international conference on Human-computer interaction: intelligent multimodal interaction environments (HCI'07), Jul. 22-27, 2007, pp. 700-709. Retrieved from the Internet: URL: <http://delivery.acm.org/10.1145/1770000/1769669/p700-lee.pdf?key1=1769669&key2=3272740821&coll=GUIDE&dl=GUIDE&CFID=98778950& CFTOKEN=13851951>, 10 pages.

Liu, et al.,"Real Time Auto-Focus Algorithm for Eye Gaze Tracking System", Proceedings of the 2007 International Symposium on Intelligent Signal Processing and Communication Systems, Nov. 28-Dec. 1, 2007, pp. 742-745, Xiamen, China, 4 pages.

Ren, et al., "Tunable-focus liquid lens controlled using a servo motor", Optics Express, Sep. 4, 2006, pp. 8031-8036, vol. 14, No. 18, Optical Society of America, Washington, D.C., USA, 6 pages.

Rolland, et al., "Displays—Head-Mounted", In Encyclopedia of Optical Engineering, New York: Marcel Dekker, 2005 [retrieved on Nov. 11, 2010] Retrieved from the Internet: URL: <http://www.optics.arizona.edu/opti588/reading/HMD_Rolland_Hua_2005.pdf>, 16 pages.

"Vibrating Lens Gives Movie Camera Great Depth of Focus", Popular Science, May 1942, pp. 88-89, vol. 140, No. 5, Popular Science Publishing Co., Inc.: New York, NY, USA [retrieved on Sep. 29, 2010] Retrieved from the Internet: URL: <http://books.google.com/books?id=gCcDAAAAMBAJ&pg=PA88&dq=vibrating+lens&hl=en&ei=TC75Tev1FqjkiAK9Idj9DA&sa=X&oi=book_result&ct=result&resnum=1&ved=0CCoQ6AEwAA#v=one page&q=vibrating%20lens&f=false>, 3 pages.

Cadden, Ricky, "Nokia Has Been Fine-Tuning Eye-Tracking Glasses", Symbian-Guru.com [online], Sep. 6, 2009 [retrieved on Aug. 26, 2010] Retrieved from the Internet: URL: <http://www.symbian-guru.com/welcome/2009/09/nokia-has-been-fine-tuning-eye-tracking-glasses.html>, 3 pages.

Handa, et al., "Development of head-mounted display with eye-gaze detection function for the severely disabled", 2008 IEEE International Conference on Virtual Environments, Human-Computer Interfaces, and Measurement Systems (VECIMS 2008), Jul. 14-16, 2008, Istanbul, Turkey, 5 pages.

"Head Fixed Eye Tracking System Specifications", Arrington Research [online], Retrieved from the Internet on Jun. 10, 2011: <URL: http://www.arringtonresearch.com/techinfo.html>, 2 pages.

Gang, Wen, "Chapter 3 Gaze Estimation System", National University of Singapore, ScholarBank@NUS [online], 2004 [retrived on Jun. 10, 2011], Retrieved from the Internet: URL:<http://scholarbank.nus.edu.sg/bitstream/handle/10635/13692/Chapter3_GazeDetectionSystem.pdf?sequence=5>,10 pages.

Reale, et al., "Viewing Direction Estimation Based on 3D Eyeball Construction for HRI", IEEE Computer Society Conference on Computer Vision and Pattern Recognition Workshops, Jun. 13-18, 2010, pp. 24-31, San Francisco, CA, IEEE Publishers, 8 pages.

Ebisawa, Yoshinobu, "Unconstrained Pupil Detection Technique Using Two Light Sources and the Image Difference Method", Visualization and Intelligent Design in Engineering and Architecture II, Published 1995, 11 pages.

Hennessey, et al., "A Single Camera Eye-Gaze Tracking System with Free Head Motion", Proceedings of the 2006 Symposium on Eye Tracking Research and Applications, Mar. 27-29, 2006, pp. 87-94, ACM, New York, NY, 8 pages.

Villanueva, et al., "Geometry Issues of Gaze Estimation", Advances in Human Computer Interaction, Oct. 2008, InTech, pp. 513-534, 22 pages.

Pomplun, et al., "Using Pupil Size as a Measure of Cognition Workload in Video-Based Eye-Tracking Studies", Department of Computer Science, Research Article [online], [retrieved on Jun. 10, 2011] Retrieved from the Internet: <URL: http://www.cs.umb.edu/~marc/pubs/pomplun_sunkara_fairley_xiao_draft.pdf>, 37 pages.

Herbelin, et al., "Coding gaze tracking data with chromatic gradients for VR Exposure Therapy", Proceedings of the 17th International Conference on Artificial Reality and Telexistence (ICAT '07), Nov. 28-30, 2007, Esbjerg, Denmark, 8 pages.

Kollenberg, et al., "Visual Search in the (Un)Real World: How Head-Mounted Displays Affect Eye Movements, Head Movements and Target Detection", Proceedings of the 2010 Symposium on Eye-Tracking Research & Applications (ETRA '10), Mar. 22-24, 2010, Austin Texas, 4 pages.

ZionEyez, A Social Media Company [online], Copyright ZionEyez 2011 [retrieved on Jun. 15, 2011], Retrieved from the Internet: <URL:http://www.zioneyez.com/#/home/>, 6 pages.

U.S. Appl. No. 13/361,923, filed Jan. 30, 2012.

Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, Helsinki, Finland, 5 pages.

Hollerer, et al., "Exploring MARS: Developing Indoor and Outdoor User Interfaces to a Mobile Augmented Reality System," Computers and Graphics 23(6), pp. 779-785, Elsevier Science Limited, Aug. 26, 1999, 12 pages.

Hua, et al., "Using a Head Mounted Projective Display in Interactive Augmented Environments", Proceedings of IEEE and ACM International Symposium on Augmented Reality, 2001, pp. 217-223, 7 pages.

Office Action dated Sep. 12, 2013, U.S. Appl. No. 13/361,923, filed Jan. 30, 2012.

Office Action dated Oct. 10, 2013, U.S. Appl. No. 13/221,770, filed Aug. 30, 2011.

Amendment dated Dec. 18, 2014, U.S. Appl. No. 13/212,172, filed Aug. 17, 2011.

Office Action dated Feb. 12, 2015, U.S. Appl. No. 13/212,172, filed Aug. 17, 2011.

Office Action dated Jan. 26, 2015, U.S. Appl. No. 13/221,770, filed Aug. 30, 2011.

Amendment dated Feb. 10, 2015, Chinese Patent Application No. 201110443987.0 filed Dec. 15, 2011.

(56) References Cited

OTHER PUBLICATIONS

Amendment dated Apr. 16, 2015, U.S. Appl. No. 13/221,770, filed Aug. 30, 2011.
Amendment dated Apr. 15, 2015, U.S. Appl. No. 13/212,172, filed Aug. 17, 2011.
Notice of Grant of Patent Right for Invention dated Apr. 2, 2015 in Chinese Patent Application No. 201110443987.0.
"Supplementary Search Report Issued in European Patent Application No. 11849398.0", Mailed Date: Apr. 16, 2015, 3 Pages.
Chinese Office Action dated Feb. 12, 2014, Chinese Patent Application No. 201110443987.0.
Response to Office Action dated Jan. 10, 2014, U.S. Appl. No. 13/221,770, filed Aug. 30, 2011.
Office Action dated Apr. 10, 2014, U.S. Appl. No. 13/212,172, filed Aug. 17, 2011.
Response to Office Action dated Mar. 9, 2014, U.S. Appl. No. 13/361,923, filed Jan. 30, 2012.
Office Action dated Apr. 18, 2014, U.S. Appl. No. 13/221,770, filed Aug. 30, 2011.
Office Action dated May 15, 2014, U.S. Appl. No. 13/361,923, filed Jan. 30, 2012.
Response to Chinese Office Action dated Jun. 27, 2014, Chinese Patent Application No. 201110443987.0.
Chinese Office Action dated Jul. 29, 2014, Chinese Patent Application No. 201110443987.0.
Response to Office Action dated Aug. 11, 2014, U.S. Appl. No. 13/212,172.
Office Action dated Sep. 18, 2014, U.S. Appl. No. 13/212,172, filed Aug. 17, 2011.
Amendment dated Sep. 19, 2014, U.S. Appl. No. 13/221,770, filed Aug. 30, 2011.
Amendment dated Oct. 13, 2014, Chinese Patent Application No. 201110443987.0 filed Dec. 15, 2011.
Amendment dated Nov. 14, 2014, Japanese Patent Application No. 2013-544548 filed Dec. 5, 2011.
Office Action dated Dec. 3, 2014, Chinese Patent Application No. 201110443987.0 filed Dec. 15, 2011.
Final Office Action dated Jun. 26, 2015 in U.S. Appl. No. 13/212,172.
Final Office Action dated Jul. 24, 2015 in U.S. Appl. No. 13/221,770.
Response to Office Action filed Jul. 14, 2015 in European Patent Application No. 11849398.0.
"Office Action Issued in European Patent Application No. 11849398.0", Mailed Date: Jun. 9, 2015, 5 Pages.
Response to Final Office Action filed Aug. 6, 2015 in U.S. Appl. No. 13/212,172.
Response to Final Office Action filed Sep. 30, 2015 in U.S. Appl. No. 13/221,770.

* cited by examiner

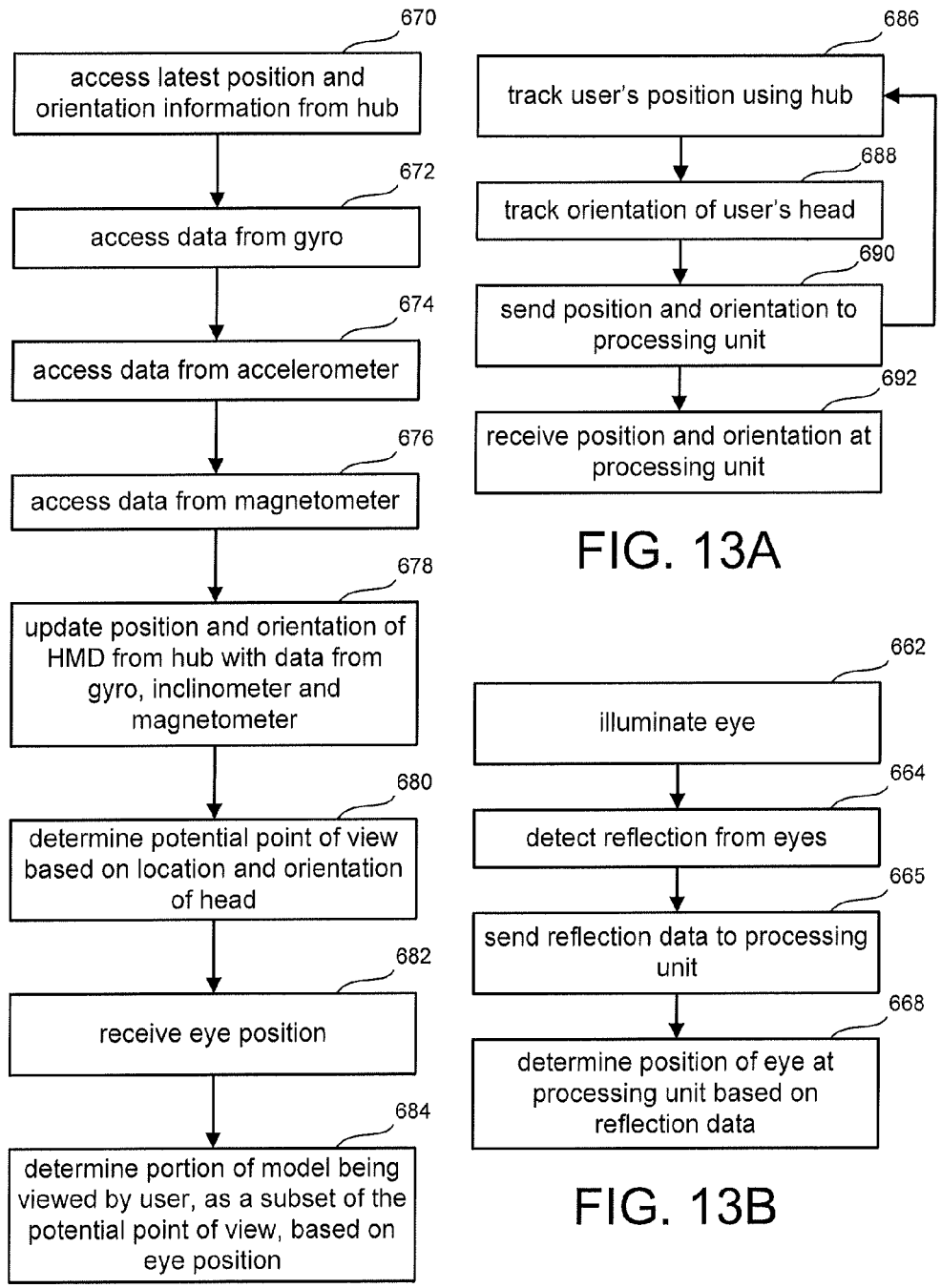

COMPREHENSION AND INTENT-BASED CONTENT FOR AUGMENTED REALITY DISPLAYS

BACKGROUND OF THE INVENTION

Augmented reality is a technology that allows virtual imagery to be mixed with a real world physical environment or space. Typically, near eye displays are worn by users to view the mixed imagery of virtual and real objects. In general, near-eye displays use a combination of optics and stereopsis to focus virtual imagery within the space.

In certain situations, the virtual imagery that is displayed to a user via a near-eye display device may include virtual images or objects that include highly detailed graphics. However, near-eye display devices being generally mobile, tend to be limited on computational resources and may not present the virtual imagery accurately to the user. In addition, a user wearing a near-eye display device is typically presented with large amounts of information that the user is not necessarily interested in looking at.

SUMMARY

Disclosed herein is a method and system that enhances a user's experience when using a near eye display device, such as a see-through display device or a head mounted display device by optimizing the visualized information displayed to the user. The visualized information is optimized by prioritizing the visualized information displayed to the user. In one approach, the visualized information is prioritized by determining the user's inferred or expressed intent to interact with one or more objects in the user's environment. In one embodiment, an optimized image is generated based on the prioritized visual information. The optimized image visually enhances the appearance of objects that the user intends to interact with in the user's environment and/or diminishes the appearance of objects that the user does not intend to interact with in the user's environment. In one approach, the user's intent is determined by analyzing the user's eye movements, and intensity of the user's gaze on the objects in the user's environment. In another approach, the user's intent is automatically determined based on user specific information related to the user. In one embodiment, the optimized image reduces the computational resources required by the head mounted display device while processing and presenting visualized information to a user.

In another embodiment of the disclosed technology, the user's comprehension of visualized information in the user's environment is increased by automatically enhancing one or more objects in the user's environment. In one embodiment, an optimized image that visually enhances the appearance of the one or more objects that increase the user's comprehension is generated. In another embodiment, the user's intent to interact with the one or more visually enhanced objects in the optimized image is determined.

In one embodiment, a method for generating an optimized image based on user intent in an augmented reality system is provided. In one approach, the method includes determining objects or people of interest in a scene the user is viewing using a see-through display device. The field of view of the user is determined. The field of view is a portion of the space or environment that the user is looking at. The focal region of the user within the field of view is determined. The user's intent to interact with one or more objects or people in the focal region of the user is determined. In one embodiment, an optimized image is generated for the user based on the user's intent. The optimized image is displayed to the user, via the see-through display device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 12 is a flowchart describing one embodiment of a process for tracking the field of view of a user and determining the user's focal region.

FIG. 13A is a flowchart describing one embodiment of a process performed by the hub computing system to provide tracking information used in the process of FIG. 12.

FIG. 13B is a flowchart describing one embodiment of a process for tracking an eye, the results of which are used by the process of FIG. 12.

DETAILED DESCRIPTION

Technology is disclosed by which a user's experience when using a near eye display device is enhanced. A user looks at a scene via a near eye display device such as a head mounted display device. The user's field of view, which is a portion of the environment or space that the user may observe, is determined. Objects of possible interest within the field of view are also determined. The field of view may include a user's focal region, or what the user is actually focusing on within the field of view. The user's focal region is determined by tracking the position of the user's eyes in the field of view. The user's inferred or expressed intent to interact with one or more objects in the user's focal region is then determined. In one approach, the user's intent to interact with one or more objects in the user's focal region is determined by detecting the user's eye movement patterns in the user's focal region and determining the intensity of the user's gaze on one or more objects being viewed by the user in the user's focal region. In another approach, the user's intent to interact with one or more objects in the user's focal region is automatically determined by accessing user-specific information related to the user. In another approach, the user's intent to interact with one or more objects in the user's focal region is determined by prompting the user to specify intent to interact with one or more objects via a user physical action, such as a voice input, keyboard entry, a touch sensitive device or a gesture. In yet another embodiment, a user's inferred or expressed intent to interact with an one or more objects is determined by the environment and other factors, such as the time of day, location, and external inputs. An optimized image is generated based on the user's need or intent. The optimized image is displayed to the user, via the head mounted display device. The optimized image may include one or more of an enhanced appearance of objects in the user's focal region, a diminished appearance of objects outside the user's focal region but within the user's field of view and augmented content such as virtual images, or virtual objects related to the objects that the user intends to interact with, in the user's focal region. Any one or more of such enhancements may be used in combination.

Figure 1:
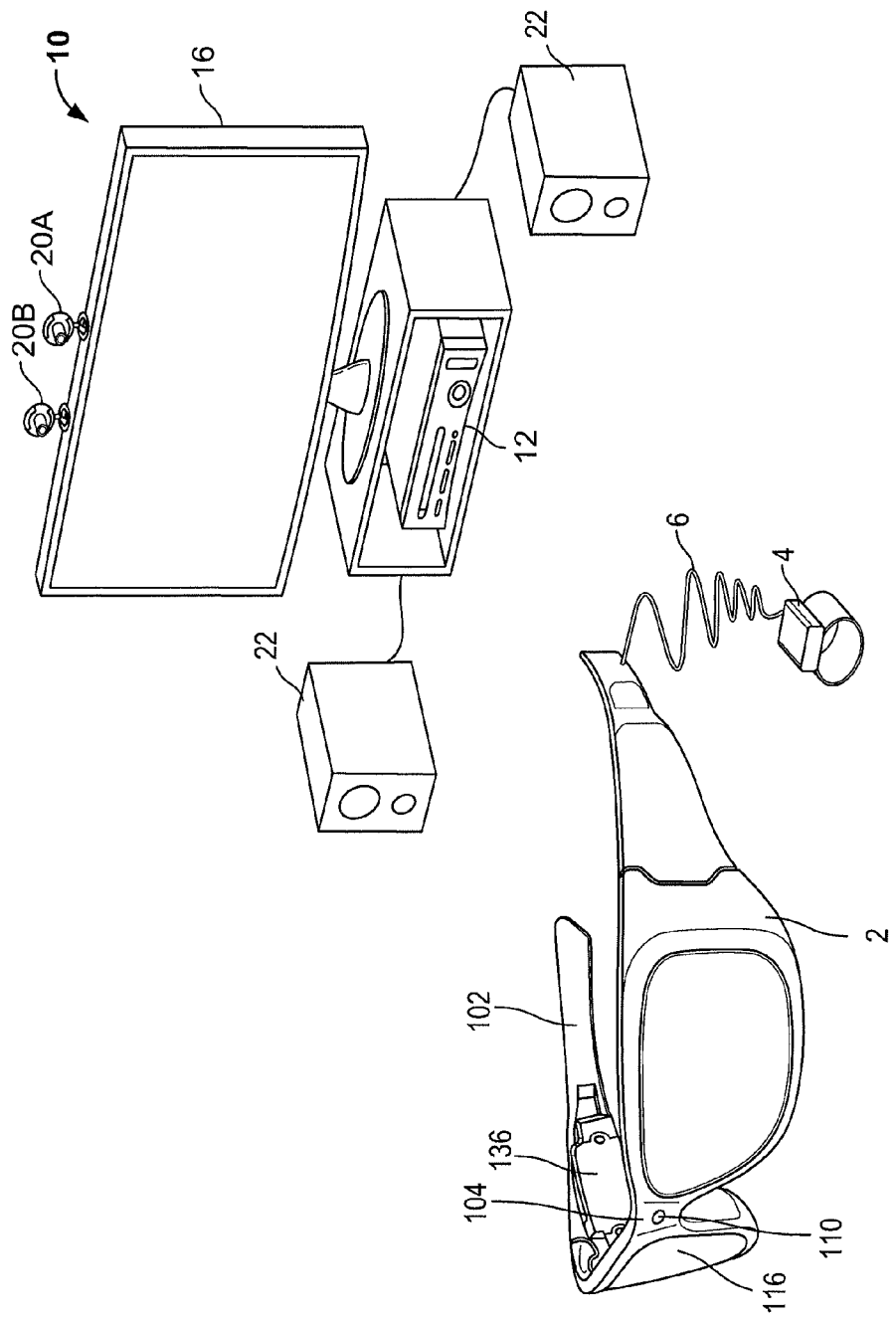
FIG. 1 is a block diagram depicting example components of one embodiment of the system for generating optimized content based on user intent.

FIG. 1 is a block diagram depicting example components of one embodiment of a system 10 for generating an optimized image based on user intent. System 10 includes a see-through display device as a near-eye, head mounted display device 2 in communication with processing unit 4 via wire 6.

In other embodiments, head mounted display device 2 communicates with processing unit 4 via wireless communication. Head mounted display device 2, which in one embodiment is in the shape of glasses, is worn on the head of a user so that the user can see through a display and thereby have an actual direct view of the space in front of the user. The use of the term "actual and direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is worn by the user and includes much of the computing power used to operate head mounted display device 2. Processing unit 4 communicates wirelessly (e.g., WiFi, Bluetooth, infra-red, or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes one or more capture devices, such as capture devices 20A and 20B. In other embodiments, more or less than two capture devices can be used. In one example implementation, the capture devices 20A and 20B are pointed in different directions so that they capture different portions of the room. It may be advantageous that the field of view of the two capture devices slightly overlap so that hub computing system 12 can understand how the fields of view of the capture devices relate to each other. In this manner, multiple capture devices can be used to view an entire room (or other space). Alternatively, one capture device can be used if the capture device can be panned during operation so that over time the field of view is viewed by the capture device. Non-overlapping capture devices can also determine fields of view in relation to another known point, such as the position of the head mounted display worn by a user.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers 22.

Hub computing device 10, with capture devices 20A and 20B, may be used to recognize, analyze, and/or track human (and other types of) targets. For example, a user wearing head mounted display device 2 may be tracked using the capture devices 20A and 20B such that the gestures and/or movements of the user may be captured to animate an avatar or on-screen character and/or may be interpreted as controls that may be used to affect the application being executed by hub computing system 12.

In one embodiment of the disclosed technology, and as will be discussed in detail below, system 10 generates an optimized image for the user based on determining the user's intent to interact with one or more objects in the user's environment. The optimized image may include an enhanced appearance of objects that the user intends to interact with, a diminished appearance of objects that the user does not intend to interact with, or both. The optimized image is displayed to the user, via the head mounted display device 2.

Figure 2:
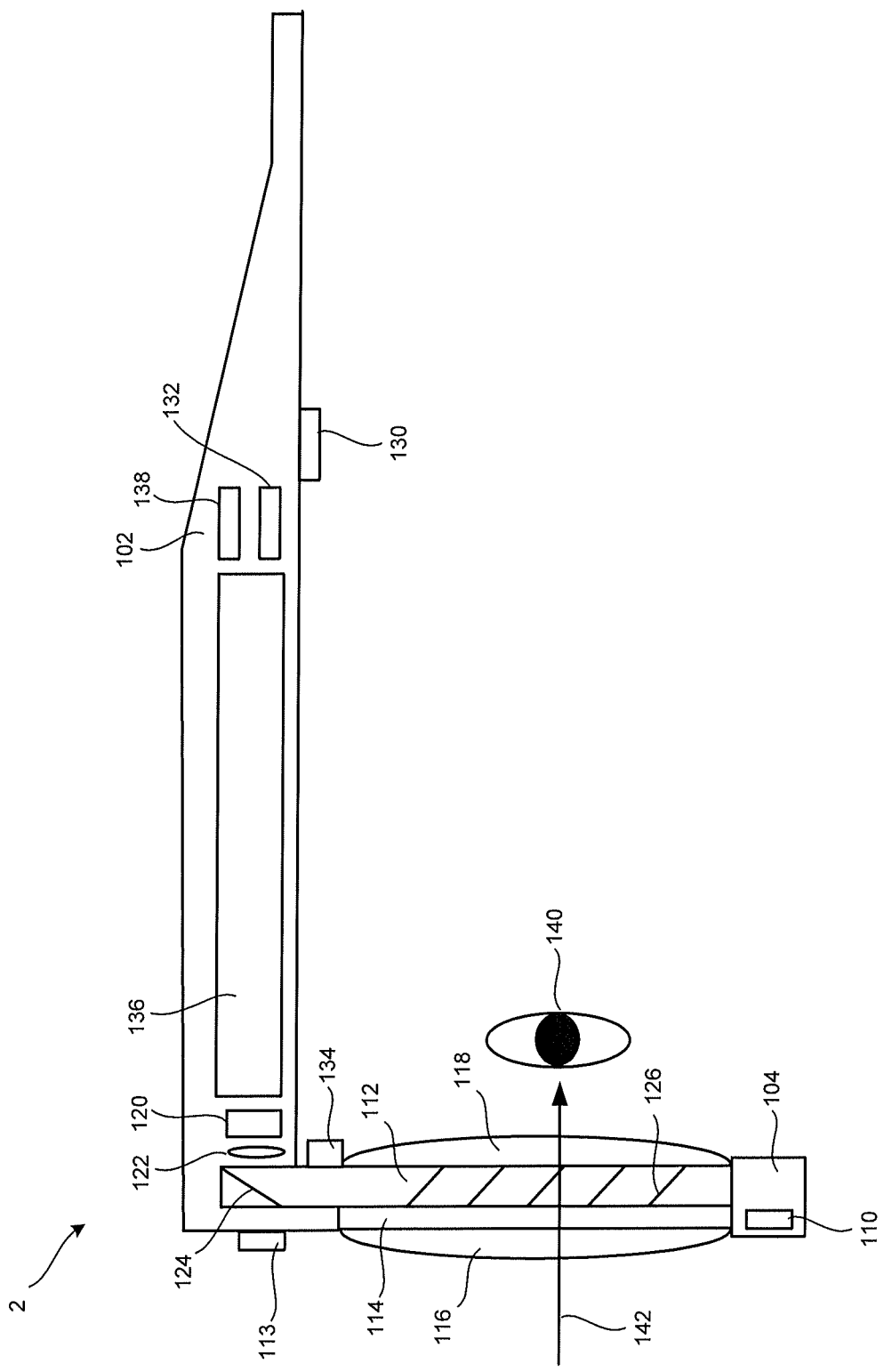
FIG. 2 is a top view of a portion of one embodiment of a head mounted display unit.

FIG. 2 depicts a top view of a portion of head mounted display device 2, including a portion of the frame that includes temple 102 and nose bridge 104. Only the right side of head mounted display device 2 is depicted. Built into nose bridge 104 is a microphone 110 for recording sounds and transmitting that audio data to processing unit 4, as described below. At the front of head mounted display device 2 is room facing video camera 113 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. In one embodiment, the display includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below. In alternative embodiments, an opacity filter 114 may not be utilized.

Mounted to or inside temple 102 is an image source, which (in one embodiment) includes micro display assembly 120 for projecting a virtual image and lens 122 for directing images from micro display 120 into light guide optical element 112. In one embodiment, lens 122 is a collimating lens.

Control circuits 136 provide various electronics that support the other components of head mounted display device 2. More details of control circuits 136 are provided below with respect to FIG. 3. Inside, or mounted to temple 102, are ear phones 130, inertial sensors 132 and temperature sensor 138. In one embodiment inertial sensors 132 include a three axis magnetometer 132A, three axis gyro 132B and three axis accelerometer 132C (See FIG. 3). The inertial sensors are for sensing position, orientation, and sudden accelerations of head mounted display device 2.

Micro display 120 projects an image through lens 122. There are different image generation technologies that can be used to implement micro display 120. For example, micro display 120 can be implemented in using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. The illumination is forward lit by either a white source or RGB source, depending on the technology. Digital light processing (DGP), liquid crystal on silicon (LCOS) and Mirasol® display technology from Qualcomm, inc. are all examples of reflective technologies which are efficient as most energy is reflected away from the modulated structure and may be used in the system described herein. Additionally, micro display 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. In one embodiment, each eye will have its own light guide optical element 112.

When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

An opacity filter such as an LCD has generally not been used with a see-through lens as described herein because at this near distance to the eye it can be out of focus. However, in some cases, this result can be desirable. A user sees the virtual image with crisp color graphics via the normal HMD display using additive color, which is designed to be in focus. The LCD panel is placed "behind" this display such that a fuzzy black border surrounds any virtual content, making it as opaque as desired. The system converts the flaw of natural blurring to expediently obtain the feature of anti-aliasing and bandwidth reduction. These are a natural result of using a lower-resolution and out-of-focus image. There is an effective smoothing of the digitally-sampled image. Any digital image is subject to aliasing, where the discrete nature of the sampling causes errors against the naturally analog and continuous signal, around the wavelengths of light. Smoothing means visually closer to the ideal analog signal. Although information lost to the low resolution is not recovered, the resulting errors are less noticeable.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Figure 2A:
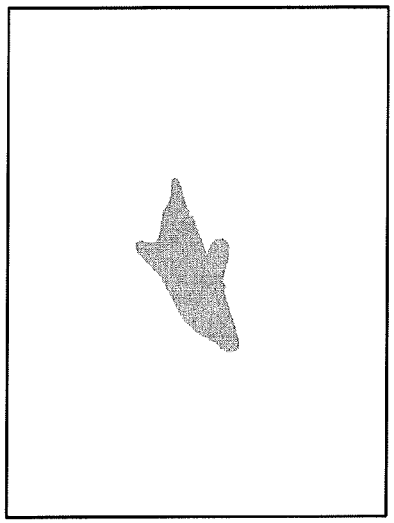
FIGS. 2A-2E provide example images that illustrate the operation of an opacity filer.
Figure 2B:
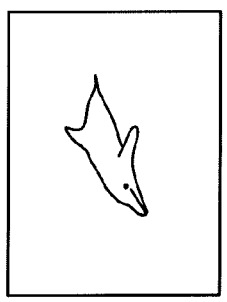
Figure 2C:
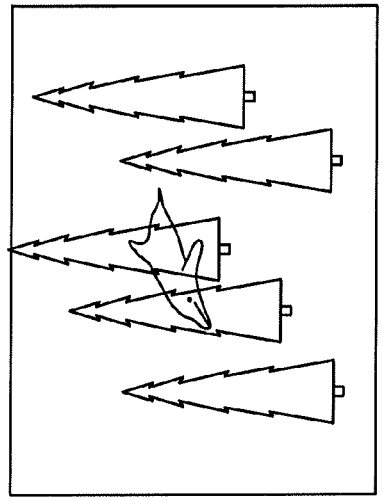
Figure 2D:
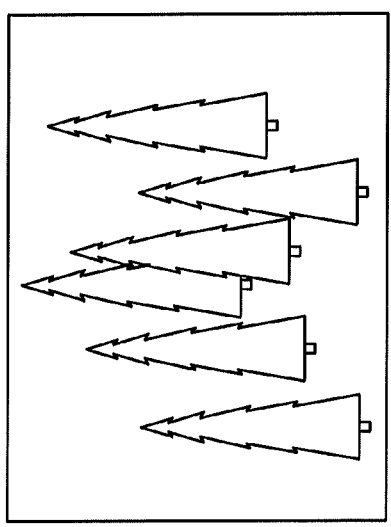
Figure 2E:
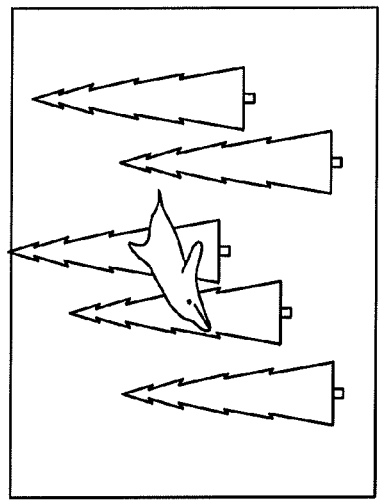

To provide an example of the operation of the opacity filter, FIG. 2A depicts an example real-world scene of a forest that is visible to a human eye looking through head mounted display device 2. FIG. 2B depicts a virtual image, which in this case is a dolphin. FIG. 2C depicts an example configuration of an opacity filter based on a shape of the virtual image of FIG. 2B. The opacity filter provides a darkened region of increased opacity where the dolphin will be rendered. An increased opacity generally refers to a darkening of pixels which can include allowing less light to pass through. A darkening to different grey levels (or black) in a monochrome scheme, or a darkening to different color levels in a color scheme can be used. FIG. 2D depicts the example image which is seen by a user and is the result of projecting the virtual image of the dolphin into the user's vision and using the opacity filter to remove light for the pixels corresponding to the position of the virtual image of the dolphin. As can be seen, the background is not visible through the dolphin. For comparison purposes, FIG. 2E shows the inserting of the virtual image into the real image without using the opacity filter. As can be seen, the real background can be seen through the virtual image of the dolphin.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2), which will include an eye tracking illumination device 134A and eye tracking camera 134B (see FIG. 3). In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detects the reflection of the cornea. For example, see U.S. Pat. No. 7,401, 920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately. Alternatively, eye tracking camera may be an alternative form of tracking camera using any motion based image of the eye to detect position, with or without an illumination source.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 2 shows one assembly with one IR emitter, the structure of FIG. 2 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes, such as a small camera mounted on the inside of the glasses, can also be used.

It should be understood that one or more additional detectors may be included on the head mounted display device 2. Such detectors may include, without limitation, SONAR, LIDAR, Structured Light, and/or Time of Flight distance detectors positioned to detect information that a wearer of the device may be viewing.

FIG. 2 only shows half of the head mounted display device 2. A full head mounted display device would include another set of see through lenses, another opacity filter, another light guide optical element, another micro display 136, another lens 122, room facing camera, eye tracking assembly, micro display, earphones, and temperature sensor. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3:
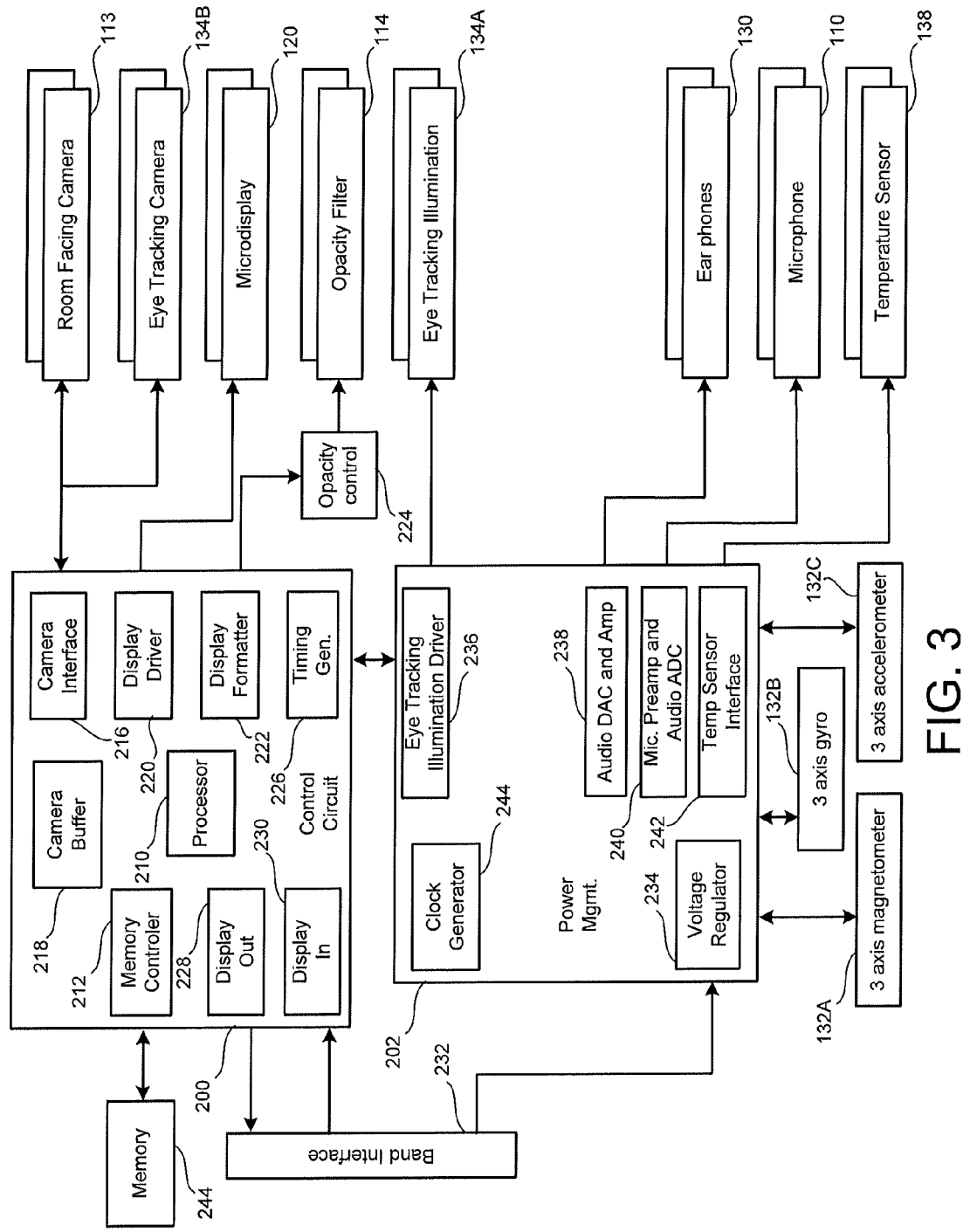
FIG. 3 is a block diagram of one embodiment of the components of a head mounted display unit.
Figure 4:
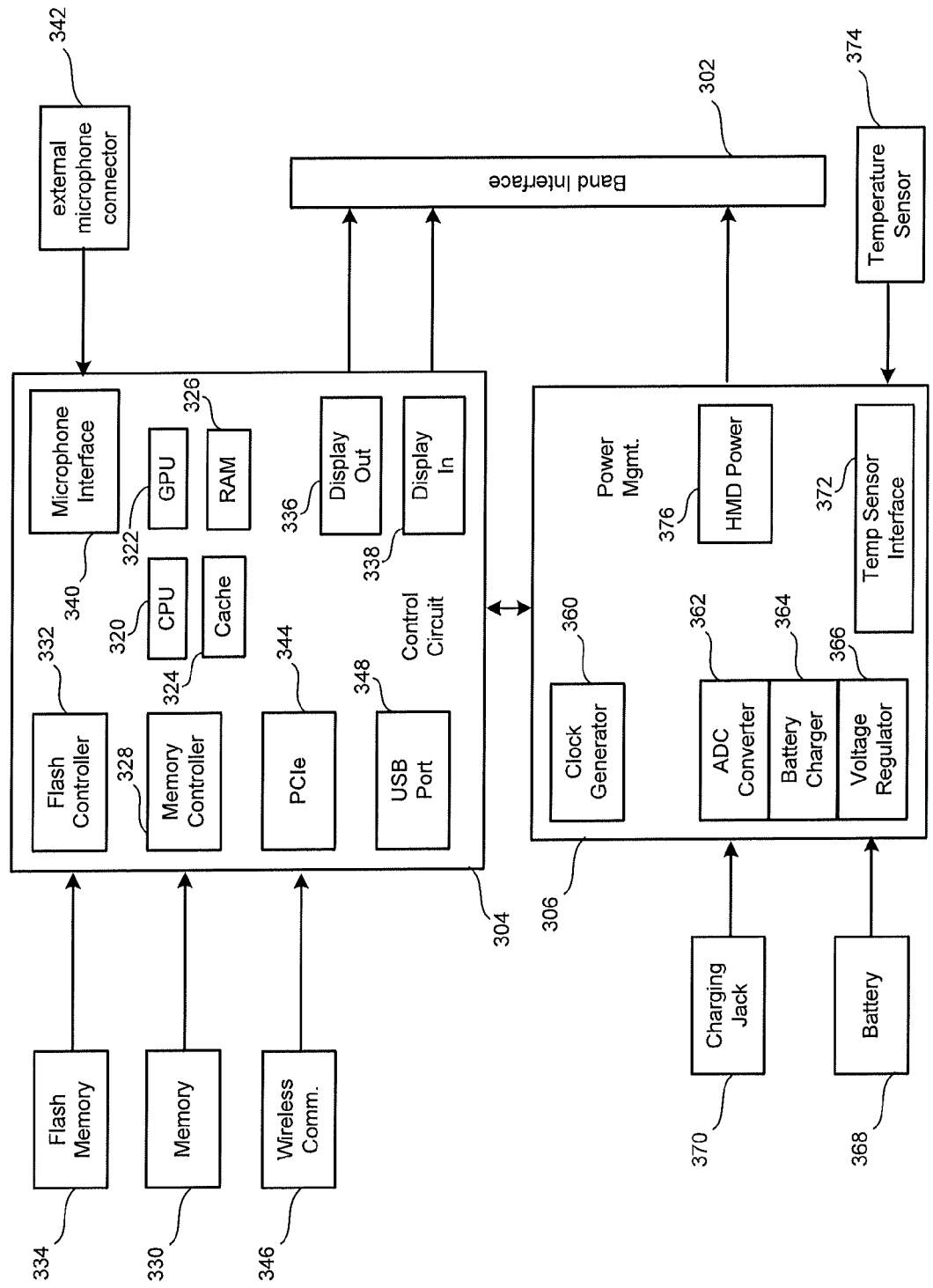
FIG. 4 is a block diagram of one embodiment of the components of a processing unit associated with a head mounted display unit.

FIG. 3 is a block diagram depicting the various components of head mounted display device 2. FIG. 4 is a block diagram describing the various components of processing unit 4. Head mounted display device 2, the components of which are depicted in FIG. 3, are used to display an optimized image to the user, based on determining the user's intent to interact with one or more objects in the user's environment. Additionally, the head mounted display device components of FIG. 3 include many sensors that track various conditions. Head mounted display device 2 will receive instructions about the virtual image from processing unit 4 and will provide the sensor information back to processing unit 4. Processing unit 4, the components of which are depicted in FIG. 3, will receive the sensory information from head mounted display device 2 and also from hub computing device 12 (See FIG. 1). Based on that information, processing unit 4 will determine where and when to provide a virtual image to the user and send instructions accordingly to the head mounted display device of FIG. 3.

Note that some of the components of FIG. 3 (e.g., rear facing camera 113, eye tracking camera 134B, micro display 120, opacity filter 114, eye tracking illumination 134A, earphones 130, and temperature sensor 138) are shown in shadow to indicate that there are two of each of those devices, one for the left side and one for the right side of head mounted display device 2. FIG. 3 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 113 and stores images received from the room facing cameras in camera buffer 218. Display driver 220 will drive micro display 120. Display formatter 222 provides information, about the virtual image being displayed on micro display 120, to opacity control circuit 224, which controls opacity filter 114. Timing generator 226 is used to provide timing data for the system. Display out interface 228 is a buffer for providing images from room facing cameras 113 to the processing unit 4. Display in 230 is a buffer for receiving images such as a virtual image to be displayed on micro display 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 receive the audio information from earphones 130. Microphone preamplifier and audio ADC 240 provide an interface for microphone 110. Temperature sensor interface 242 is an interface for temperature sensor 138. Power management unit 202 also provides power and receives data back from three axis magnetometer 132A, three axis gyro 132B and three axis accelerometer 132C.

FIG. 4 is a block diagram describing the various components of processing unit 4. FIG. 4 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Blue-Tooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

The above-described system will be configured to insert a virtual image into the field of view of a user so that the virtual image replaces the view of a real world object. Alternatively, the virtual image can be inserted without replacing the image of a real world object. In various embodiments, the virtual image will be adjusted to match the appropriate orientation, size and shape based on the object being replaced or the environment for which the image is being inserted into. In addition, the virtual image can be adjusted to include reflectivity and shadows. In one embodiment, head mounted display device 12, processing unit 4 and hub computing device 12 work together as each of the devices includes a subset of sensors that are used to obtain the data for determining where, when and how to insert the virtual images. In one embodiment, the calculations that determine where, how and when to insert a virtual image and performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 12.

In one example embodiment, hub computing device 12 will create a model of the environment that the user is in and track various moving objects in that environment. In an alternative embodiment, object and users of interest in the environment are determined by other means. In addition, hub computing device 12 tracks the field of view of the head mounted display device 2 by tracking the position and orientation of head mounted display device 2. The model and the tracking information are provided from hub computing device 12 to processing unit 4. Sensor information obtained by head mounted display device 2 is transmitted to processing unit 4. Processing unit 4 then uses additional sensor information it receives from head mounted display device 2 to refine the field of view of the user and provide instructions to head mounted display device 2 on how, where and when to insert the virtual image.

Figure 5:
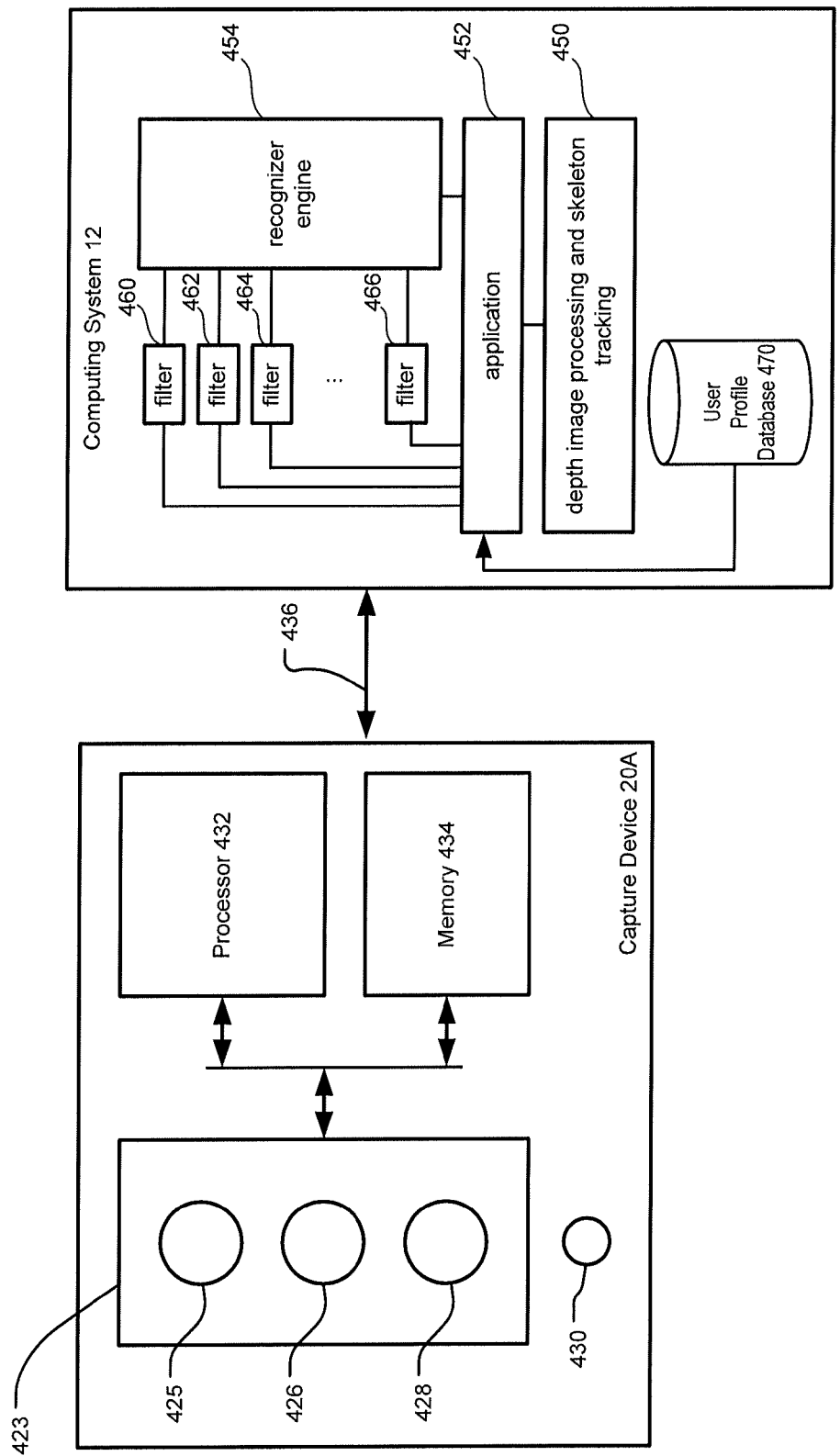
FIG. 5 is a block diagram of one embodiment of the components of a hub computing system used with head mounted display unit.

FIG. 5 illustrates an example embodiment of hub computing system 12 with a capture device. In one embodiment, capture devices 20A and 20B are the same structure, therefore, FIG. 5 only shows capture device 20A. According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 5, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 23 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 453, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, ..., 466 each comprising information concerning a gesture, action or condition that may be performed by any person or object detectable by capture device 20A or 20B. For example, the data from capture device 20A may be processed by filters 460, 462, 464, ..., 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, ..., 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality used to solve particular instances of gesture recognition.

Filters 460, 462, 464, ..., 466 are loaded and implemented on top of the recognizer engine 454 and can utilize services provided by recognizer engine 454 to all filters 460, 462, 464, ..., 466. In one embodiment, recognizer engine 454 receives data to determine whether it meets the requirements of any filter 460, 462, 464, ..., 466. Since these provided services, such as parsing the input, are provided once by recognizer engine 454 rather than by each filter 460, 462, 464, ..., 466, such a service need only be processed once in a period of time as opposed to once per filter for that period, so the processing used to determine gestures is reduced.

Application 452 may use the filters 460, 462, 464, ..., 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

In one embodiment, computing system 12 includes a user profile database 470 that includes user-specific information related to one or more users interacting with hub computing system 12. In one example, the user-specific information includes information related to a user such as the user's expressed preferences, the user's friends' list, the user's preferred activities, a list of the user's reminders, the user's social groups, the user's current location, the user's past intents to interact with objects in the user's environment and other user created content, such as the user's photos, images and recorded videos. In one embodiment, the user-specific information may be obtained from one or more data sources such as the user's social networking sites, address book, email data, Instant Messaging data, user profiles or other sources on the Internet. In one approach, and as will be discussed in detail below, the user-specific information is utilized to automatically determine the user's intent to interact with one or more objects in the user's environment.

Figure 6:
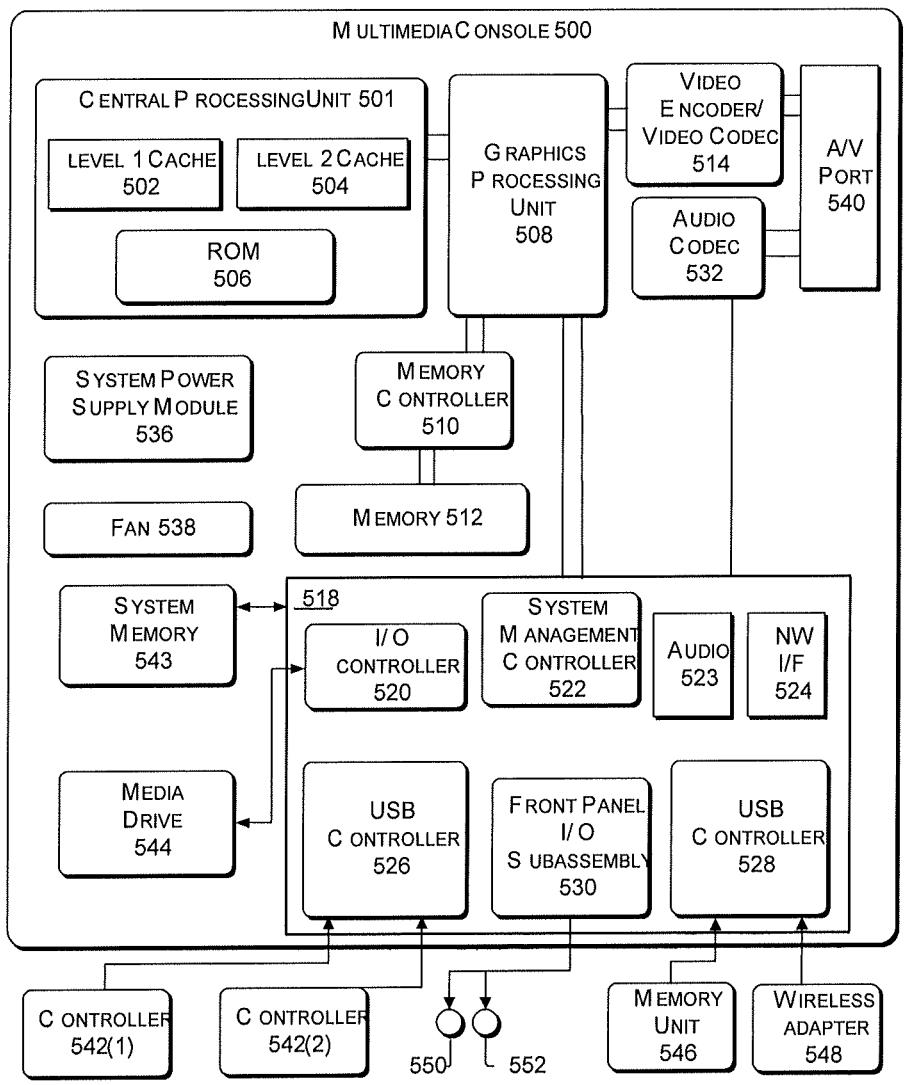
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

FIG. 1 depicts one head mounted display device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

Figure 7:
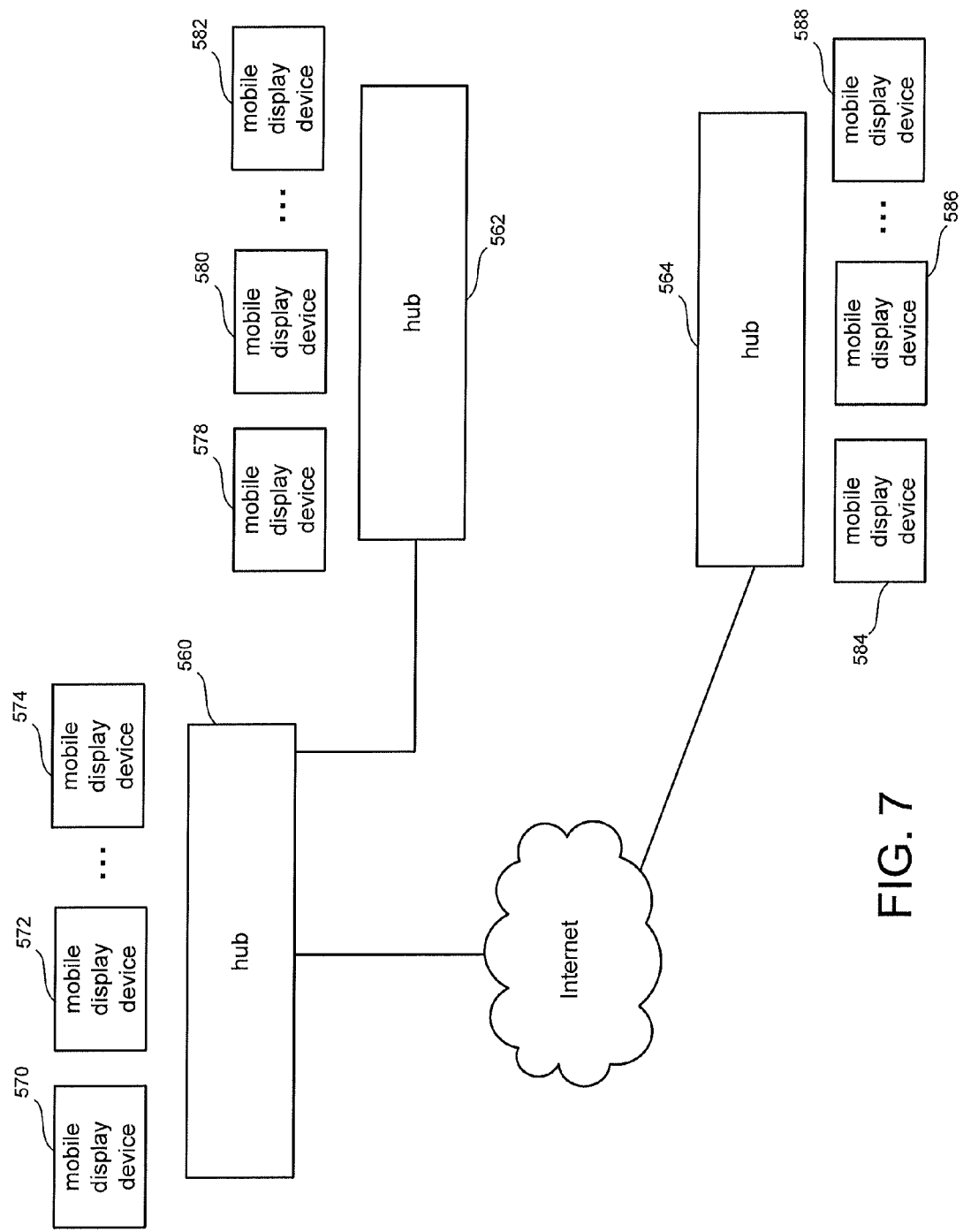
FIG. 7 is a block diagram depicting a multi-user system for generating optimized content based on user intent.

In another embodiment, a system could include multiple hubs, with each hub including one or more mobile display devices. The hubs can communicate with each other directly or via the Internet (or other networks). For example, FIG. 7 shows hubs 560, 562 and 564. Hub 560 communicates directly to hub 562. Hub 560 communicates to hub 564 via the Internet. Hub 560 communicated with mobile display devices 570, 572, . . . , 574. Hub 562 communicates with mobile display device 578, 580, . . . , 582. Hub 564 communicates with mobile display device 584, 586, . . . , 588. Each of the mobile display devices communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile display devices. Sensor information for the mobile display devices will be provided to their respective hubs and then shared to the other hubs for eventual sharing to the other mobile display devices. Thus, information shared between hubs can include skeleton tracking, information about the models, various states of applications, and other tracking. The information communicated between the hubs and their respective mobile display devices include tracking information of moving objects, the state and physics updates for the world models, geometry and texture information, video and audio, and other information used to perform the operations described herein.

Figure 8:
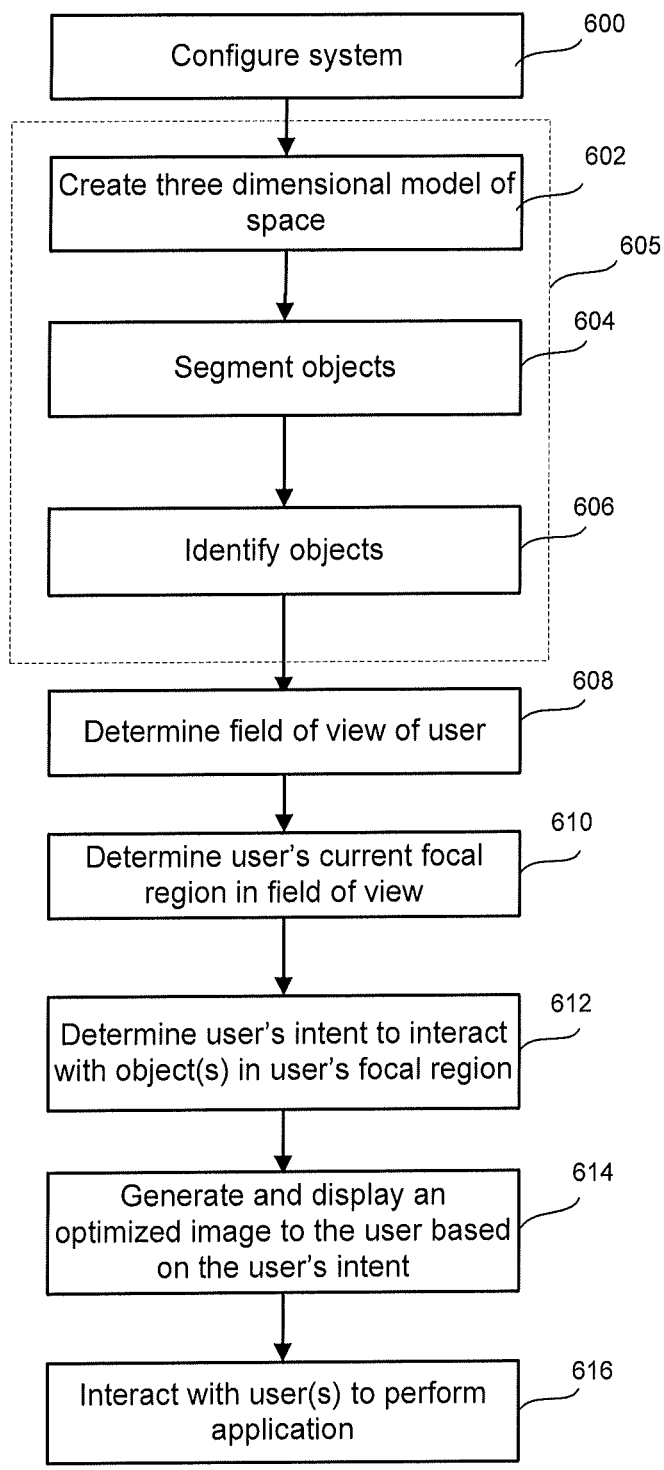
FIG. 8 describes one embodiment of a process for generating optimized content based on user intent.

FIG. 8 describes one embodiment of a process for optimizing the display of visualized information that is presented to a user of a head mounted display device. In step 600, the system 10 is configured. For example, an application (e.g., application 452 of FIG. 5) can configure the system to indicate that an optimized image is to be inserted into the three dimensional model of the scene, at a designated location. In another example, an application running on hub computing system 12 will indicate that augmented content (such as a particular virtual image or a virtual object) is to be inserted into the scene as part of a video game or other process.

At step 605, objects of interest in the user's environment will be determined. In one embodiment, this may be performed by creating a three dimensional model of the user's space as outlined in steps 602-606. In step 602, the system will create a volumetric model of the space for which head mounted display device 2 is located. In one embodiment, for example, hub computing device 12 will use depth images from one or more depth cameras to create a three dimensional model of the environment or scene in which head mounted display device 2 is located. In step 604, that model is segmented into one or more objects. For example, if hub computing device 12 creates a three dimensional model of a room, that room is likely to have multiple objects in it. Examples of objects that can be in a room include persons, chairs, tables, couches, etc. Step 604 includes determining distinct objects from each other. In step 606, the system will identify the objects. For example, hub computing device 12 may identify that a particular object is a table and another object is a chair.

Alternatively, step 605 may be performed by any number of means. In one embodiment, sensors may be embedded in one or more objects or individuals in the room. Sensors which emit a detectable signal identifying the object of interest or providing additional information such as the type of object and the level of interest one might have in the object relative to a specific application may be used to identify objects in the user's environment. Alternatively, other sensor technologies may be used to identify objects within the range of either the capture device disclosed above, other sensor devices employing other distance detection sensor technologies (such as SONAR, LIDAR, Structured Light, and/or Time of Flight distance detectors) positioned in the environment, or on the head mounted display device, can all be used to provide possible focal objects and their shape.

Another alternative is to use one or more of the above described depth cameras to perform a stereo reconstruction of the environment, one frame at a time. In yet another alternative, objects may themselves emit light pulses directed to the head mounted display to and indicate to the display that the object is of interest and that the portion of the display including the object should be highlighted.

In step 608 of FIG. 8, the system determines the field of view of the user based on the model or the above techniques. That is, the system determines a portion of the environment or space the user is looking at. In one embodiment, step 608 may be performed using hub computing device 12, processing unit 4 and head mounted display device 2. In one example implementation, hub computing device 12 will track the user and the head mounted display device 2 in order to provide a preliminary determination of location and orientation of head mounted display device 2. Sensors on the head mounted display device 2 will be used to refine the determined orientation. For example, the inertial sensors 34, described above, can be used to refine the orientation of head mounted display device 2. Additionally, the eye tracking process described below can be used to identify a subset of the initially determined field of view that corresponds to where in particular a user is looking otherwise known as the user's focal region or depth focus in the field of view. More details will be described below with respect to FIGS. 12, 13A and 13B.

In step 610, the system such as software executing in processing unit 4, determines the user's current focal region within the user's field of view. As discussed further below in FIGS. 13A and 13B, eye tracking processing based on data captured by the eye tracking camera 134 for each eye, can provide the current focal region of the user. For example, the convergence between the pupils with data indicating the face position of the user can be used to triangulate to a focal point on a focal curve, the Horopter, from which the focal region, the Panum's fusion area, can be calculated. The Panum's fusion area is the area of single vision for binocular stereopsis used by the human eyes.

In step 612, the processing unit 4 alone or in cooperation with the hub computing device 12 (under the control of software) determines the user's intent to interact with one or more objects in the user's focal region. In step 614, under the control of software, the processing unit 4 alone or in cooperation with the hub computing device 12 generates an optimized image and displays the optimized image to the user based on the user's intent to interact with the one or more objects.

In step 616, the user of head mounted display device 2 interacts with an application running on hub computing device 12 (or another computing device) based on the optimized image displayed in the head mounted display device 2.

The processing steps (608-616) of FIG. 8 can be performed continuously during operation of the system such that the user's field of view and focal region are updated as the user moves his or her head, the user's intent to interact with one or more objects in the user's focal region is determined and an optimized image is displayed to the user based on the user's intent. Each of the steps 604-614 are described in more detail below.

Figure 9:
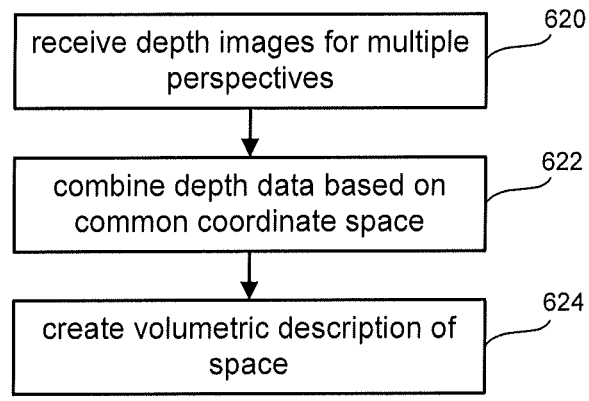
FIG. 9 describes one embodiment of a process for creating a model of the user's space.

FIG. 9 describes one embodiment of a process for creating a model of the user's space. For example, the process of FIG. 9 is one example implementation of step 602 of FIG. 8. In step 620, hub computing system 12 receives one or more depth images for multiple perspectives, such as those shown in FIG. 1, of the environment that head mounted display device is in. For example, hub computing device 12 can obtain depth images from multiple depth cameras or multiple depth images from the same camera by pointing the camera in different directions or using a depth camera with a lens that allows a full view of the environment or space for which a model will be built. In step 622, depth data from the various depth images are combined based on a common coordinate system. For example, if this system receives depth images from multiple cameras, the system will correlate the two images to have a common coordinate system (e.g., line up the images). In step 624, a volumetric description of the space is created using the depth data.

Figure 10:
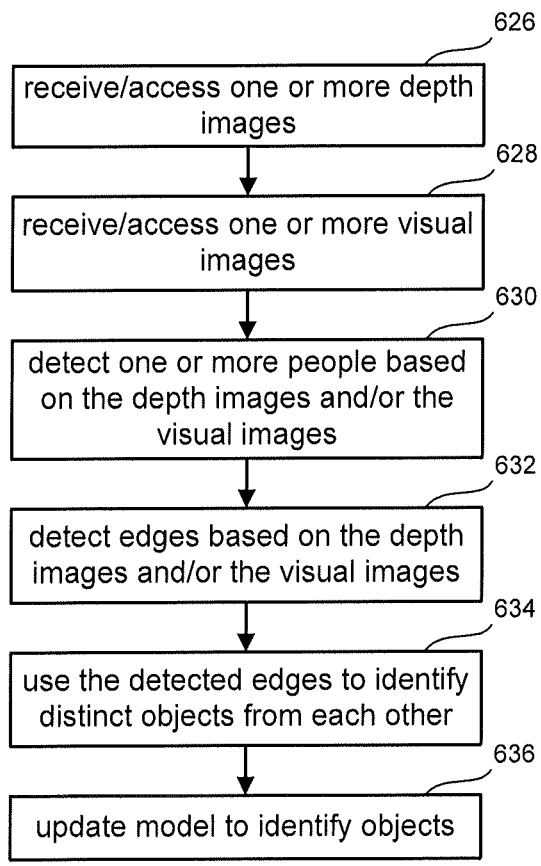
FIG. 10 is a flowchart describing one embodiment of a process for segmenting the model of the space into objects.

FIG. 10 is a flowchart describing one embodiment of a process for segmenting the model of the space into objects. For example, the process of FIG. 10 is one example implementation of step 604 of FIG. 8. In step 626 of FIG. 10, the system will receive one or more depth images from one or more depth cameras as discussed above. Alternatively, the system can access one or more depth images that it has already received. In step 628, the system will receive one or more visual images from the cameras described above. Alternatively, the system can access one or more visual images already received. In step 630, hub computing system will detect one or more people based on the depth images and/or visual images. For example, the system will recognize one or more skeletons. In step 632, hub computing device will detect edges within the model based on the depth images and/or the visual images. In step 634, hub computing device will use the detected edges to identify distinct objects from each other. For example, it is assumed that edges are boundaries between objects. In step 636, the model created using the process of FIG. 9 will be updated to show which portions of the model are associated with different objects.

Figures 11A, 11B:
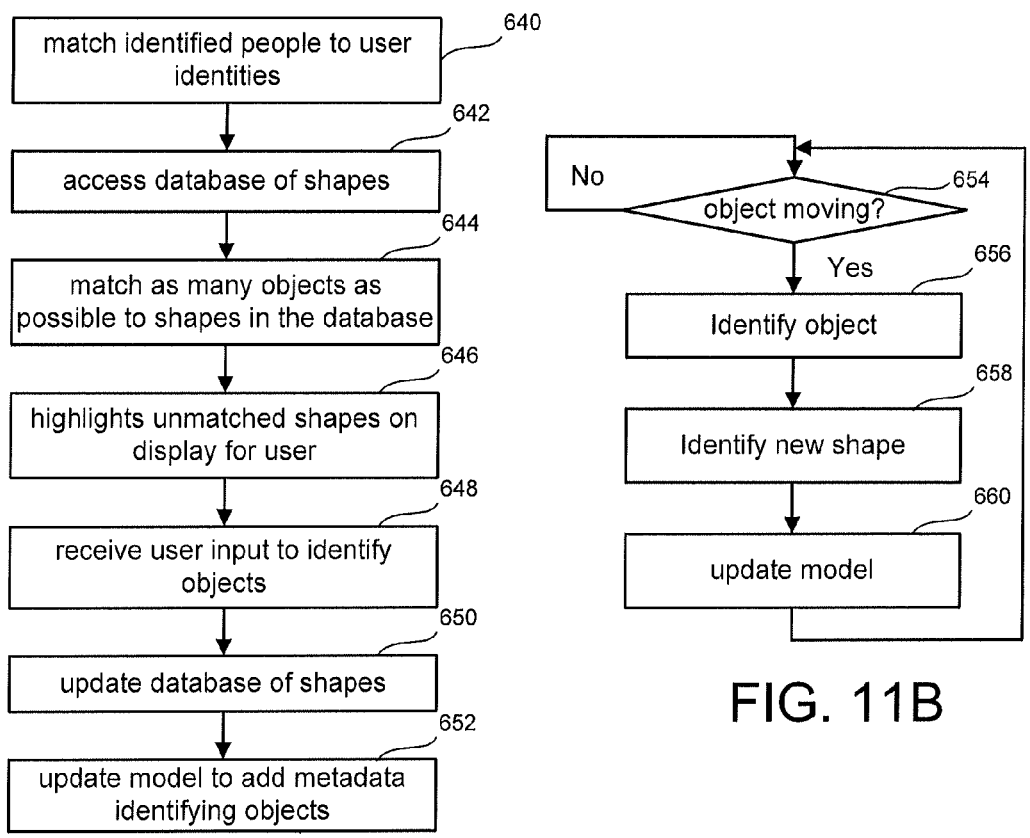
FIG. 11A is a flowchart describing one embodiment of a process for identifying objects.
FIG. 11B is a flow chart describing one embodiment of a process for updating the model created by the process of FIG. 8 in response to moving objects.

FIG. 11A is a flowchart describing one embodiment of a process for identifying objects. For example, the process of FIG. 1A1 is one example implementation of step 606 of FIG. 8. In step 640, hub computing device 12 will match identified people to user identities. For example, user profiles may include visual images that can be matched to the images of detected objects received by the capture devices. Alternatively, a user's profile can describe features of the person which can be matched based on the depth images or visual images. In another embodiment, users may log into the system and hub computing device 12 can use the login process to identify a particular user and track that user throughout the interaction described herein. In step 642, hub computing device 12 will access the database of shapes. In step 644, hub computing device will match as many objects in the model to the shapes in the database. In step 646, those shapes that are unmatched will be highlighted and displayed to the user (e.g., using monitor 16). In step 648, hub computing device 12 will receive user input that identifies each (or a subset) of the shapes highlighted. For example, the user can use a keyboard, mouse, speech input, or other type of input to indicate what each unidentified shape is. In step 650, the database of shapes is updated based on the user input in step 648. In step 652, the model of the environment created in step 602, and updated in step 636, is further updated by adding metadata for each of the objects. The metadata identifies the object. For example the metadata may indicate that the particular object is a round shiny table, John Doe, green leather couch, etc.

FIG. 11B is a flowchart describing one embodiment of a process for updating the model created by the process of FIG. 8 in response to moving objects (e.g., a moving person or other type of object). In step 654, the system determines that an object is moving. For example, the system will continuously receive depth images. If the depth images change over time, then an object is moving. If no moving object is detected, then the system will continue to receive depth images and continue to look for moving objects.

If there is a moving object, then in step 654 the system will identify the object that is moving. Frame differencing or any of various tracking technologies can be used to recognize the moving object and correlate the recognized object to one of the objects identified in step 606 of FIG. 8. Some objects will change shape when moving. For example, a human may change shape as the human walks or runs. In step 658, the new shape of the moving object is identified and stored. In step 660, the model of the space that was previously created is updated based on the new position and shape of the moving object. The process of FIG. 11B can be performed by processing unit 4 of hub computing device 12.

FIG. 12 is a flowchart describing one embodiment of a process for determining the field of view of a user, which is an example implementation of step 608 of FIG. 8, and for determining the user's focal region, which is an example implementation of step 610 of FIG. 8. The process of FIG. 12 relies on information from the hub computing device 12 and the eye tracking technology described above. FIG. 13A is a flowchart describing one embodiment of a process performed by the hub computing system to provide tracking information used in the process of FIG. 12. FIG. 13B is a flowchart describing one embodiment of a process for tracking an eye, the results of which are used by the process of FIG. 12.

In step 686 of FIG. 13A, the hub computing device 12 will track the user's position. For example, hub computing device 12 will use one or more depth images and one or more visual images to track a user (e.g., using skeleton tracking). One or more depth images and one or more visual images can be used to determine the position of the head mounted display device 2 and the orientation of the head mounted display device 2 in step 688. In step 690, the position and orientation of the user and the head mounted display device 2 are transmitted from the hub computing device 12 to processing unit 4. In step 692, the position and orientation information is received at processing unit 4. The processing steps of FIG. 13A can be performed continuously during operation of the system such that the user is continuously tracked.

FIG. 13B is a flowchart describing one embodiment for tracking a position of the user's eye in the environment. In step 662, the eye is illuminated. For example, the eye can be illuminated using infrared light from eye tracking illumination 134A. In step 664, the reflection from the eye is detected using one or more eye tracking cameras 134B. In step 665, the reflection data is sent from head mounted display device 2 to processing unit 4. In step 668, processing unit 4 will determine the position of the eye based on the reflection data, as discussed above.

FIG. 12 is a flowchart describing one embodiment of a process for determining the field of view of the user (e.g., step 608 of FIG. 8) and the focal region of the user (e.g., step 610 of FIG. 8). In step 670, processing unit 4 will access the latest position and orientation information received from the hub. The process of FIG. 12 can be performed continuously as depicted by the arrow from step 686 to step 690, therefore, processing unit 4 will periodically receive updated position and orientation information from hub computing device 12. However, processing unit 4 will need to draw the virtual image more frequently than it receives the updated information from hub computing device 12. Therefore, processing unit 4 will need to rely on information sensed locally (e.g., from the head mounted device 2) to provide updates to the orientation in between samples from hub computing device 12.

In step 672, processing unit 4 will access data from three axis gyro 132B. In step 674, processing unit 4 will access data from three axis accelerometer 132C. In step 676, processing unit 4 will access data from three axis magnetometer 132A. In step 678, processing unit 4 will refine (or otherwise update), the position and orientation data from hub computing device 12 with the data from the gyro, accelerometer and magnetometer. In step 680, processing unit 4 will determine the potential point of view based on the location and orientation of head mounted display device.

In step 682, processing unit 4 will access the latest eye position information. In step 684, processing unit 4 will determine portion of model being viewed by user, as a subset of the potential point of view, based on eye position. For example, the user may be facing a wall and, therefore, the point of the view for the head mounted display could include anywhere along the wall. However, if the user's eyes are pointed to the right, then step 684 will conclude that the field of view of the user is only the right hand portion of the wall. At the conclusion of step 684, processing unit 4 has determined the point of view of the user through head mounted display 2. Then, processing unit 4 can identify a location within that field of view to insert a virtual image and block light using the opacity filter. The processing steps of FIG. 12 can be performed continuously during operation of the system such that the user's field of view and focal region are continuously updated as the user moves his or her head.

Figure 14:
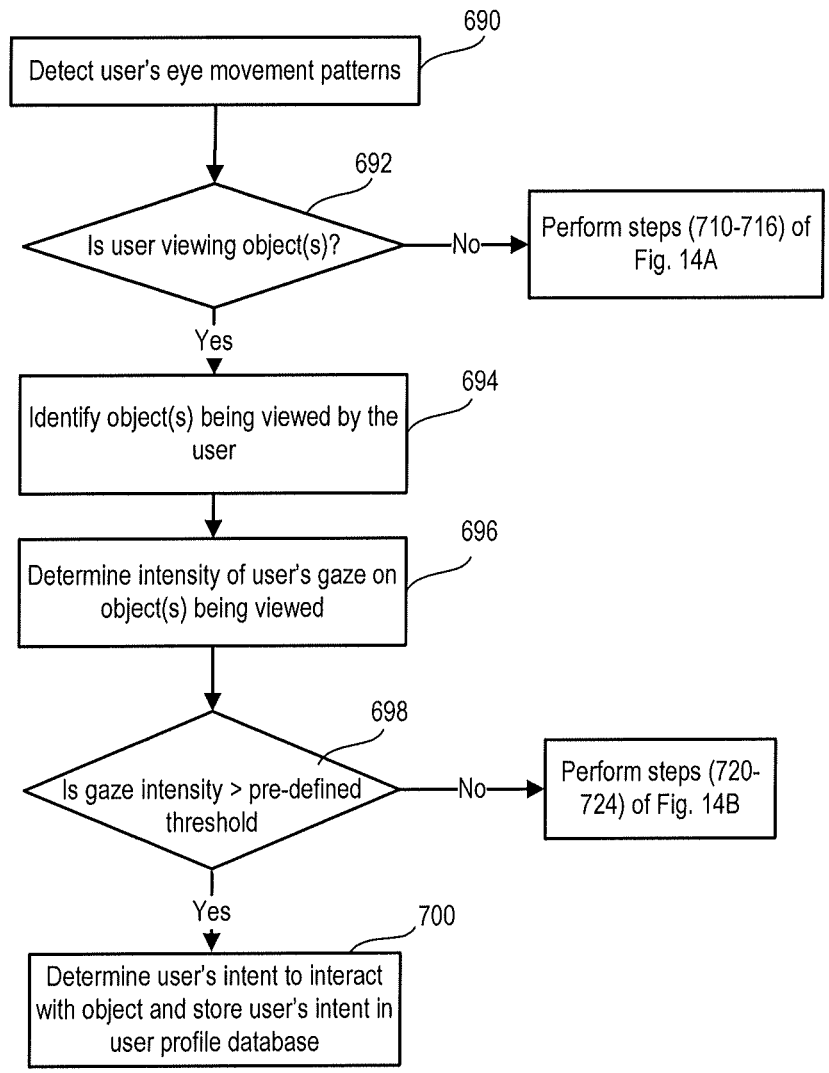
FIG. 14 is a flowchart describing one embodiment of a process for determining a user's intent to interact with one or more objects in the user's focal region.
Figure 14A:
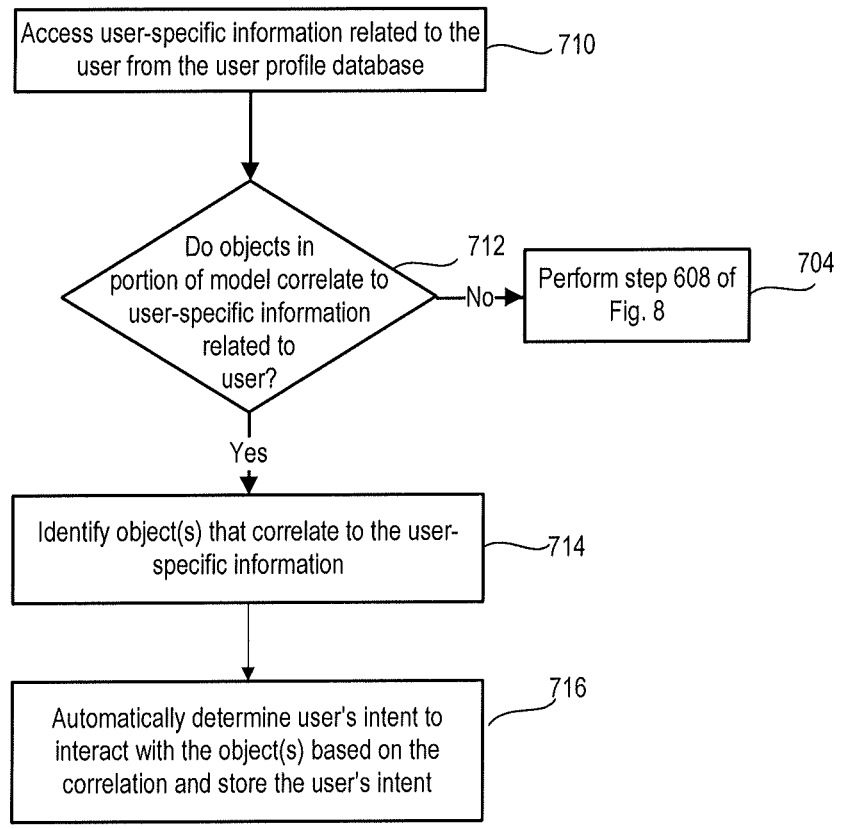
FIG. 14A is a flowchart describing another embodiment of a process for determining a user's intent to interact with one or more objects in the user's focal region.
Figure 14B:
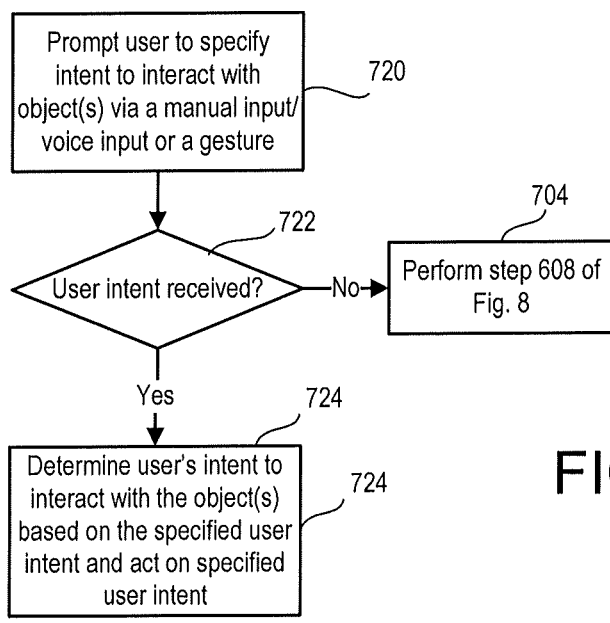
FIG. 14B is a flowchart describing another embodiment of a process for determining a user's intent to interact with one or more objects by prompting the user to specify intent to interact with one or more objects.

FIG. 14 is a flowchart describing one embodiment of a process for determining a user's inferred or expressed intent to interact with one or more objects in the user's focal region. For example, the process of FIG. 14 is one example implementation of step 612 of FIG. 8. The steps of FIG. 14 may be performed, under the control of software, by the hub computing device 12 or the processing unit 4. FIG. 14 describes a process by which a user's intent to interact with one or more objects in the user's focal region is determined based on detecting the user's eye movement patterns in the user's focal region and determining the intensity of the user's gaze on one or more objects being viewed by the user in the user's focal region. FIG. 14A describes a process by which a user's intent to interact with one or more objects or people is inferred based on user-specific information related to the user. FIG. 14B describes a process by which a user's intent to interact with one or more objects is determined based on the user's expressed intent to interact with one or more objects.

In step 690 of FIG. 14, the user's eye movement patterns in the user's focal region are detected. As will be appreciated, eye movements are typically divided into fixations and saccades, when the eye gaze pauses in a certain position, and when it moves to another position, respectively. Eye movement patterns may therefore be defined as a series of fixations and saccades followed by the user's eyes when looking at an image or a visual scene. The resulting series of fixations and saccades is generally referred to as a scanpath, which is a path followed by the user's eyes when looking at a visual scene. In addition, most information from the eye is made available during a fixation. The central one or two degrees of the visual angle (the fovea) provide the bulk of visual information and the input from larger eccentricities (the periphery) is less informative. Thus, the locations of fixations along a scanpath show the information loci on the stimulus that were processed by the user's eyes when viewing a visual scene. In one example, the locations of fixations along the scanpath may be used to detect one or more objects being viewed by the user in the user's focal region.

In step 692, it is determined if the user is viewing one or more objects in the user's focal region. As discussed above, in one example, the locations of fixations along the scanpath may be used to detect if the user is viewing one or more objects in the user's focal region. If it is determined that the user is not viewing any object, then, in one embodiment, steps (710-716) of the process described in FIG. 14A are performed.

If it is determined that the user is viewing one or more objects in the user's focal region, then the objects being viewed by the user are identified in step 694. The one or more objects may be identified by utilizing the process described in FIG. 11. For example, the objects may be identified as a wall clock, a round shiny table, John Doe, a green leather couch, etc. In step 696, the intensity of the user's gaze on the one or more objects being viewed by the user in the user's focal region is determined. In one example, the intensity of the user's gaze is determined based on determining the duration of the user's gaze (or fixation) on the objects within a time window.

In step 698, it is determined if the user's gaze intensity is greater than a pre-defined threshold value. In one example, the pre-defined threshold value is 10 seconds. If the gaze intensity is greater than the pre-defined threshold value, then the user's intent to interact with the one or more objects in the user's focal region is inferred in step 700. In one example, each of the objects in the user's environment may include a parameter that represents the user's intent to interact with an object. In one example, the system 10, upon determining the user's intent to interact with an object, may assign a binary value to the object's parameter, wherein a binary value of 1 indicates the user's intent to interact with the object. In step 700, the user's intent is stored in the user profile database 470.

In another example, the intensity of the user's gaze (determined in step 696) may also determine the type of activity being performed by the user while viewing an object. For example, the length of sequences of saccades derived from the intensity of the user's gaze may be used to determine if the user is searching/browsing the object, reading a line of text displayed by the object, thinking about the object or looking intensely at the object. In one embodiment, the type of activity being performed by the user as determined by the intensity of the user's gaze on the object may also be used to infer the user's intent to interact with the object.

In step 698, if it is determined that the user's gaze intensity is not greater than the pre-defined threshold, in one embodiment, steps (720-724) of the process described in FIG. 14B are performed.

FIG. 14A is a flowchart describing another embodiment of a process for determining a user's intent to interact with one or more objects in the user's focal region. In one embodiment, the process described in FIG. 14A is performed when the user's eye movement patterns indicate that the user is not viewing any specific object in the user's focal region (e.g., step 692 of FIG. 14). For example, consider an exemplary situation in which a user wearing a HMD device has less than normal vision and may not be able to see objects or people in the his or her environment very clearly. In one approach, the user's intent to interact with one or more objects or people may automatically be inferred by accessing user-specific information related to the user. The process for automatically determining a user's intent is described in steps 710-716 below.

In step 710, user-specific information related to the user is accessed from the user profile database 470. As discussed above, user-specific information may include, information related to a user such as the user's expressed preferences, the user's friends' list, the user's preferred activities, the user's social groups, the user's current location, the user's past intents to interact with objects, the user's reminders, and other user created content, such as the user's photos, images and recorded videos.

In step 712, it is determined if any of the objects or people in the user's focal region correlate to the user-specific information. For example, in an exemplary situation when a user is trying to find his or her friends at a party, the people that appear in the user's focal region may be correlated to the user-specific information related to the user to determine if one or more of the people correspond to any of the user's friends. For example, a facial recognition technique may be utilized to correlate images of people in the user's focal region to visual images of the user's friends that are stored in the user profile database 470 to determine if one or more of the people in the user's focal region correspond to any of the user's friends.

In step 712, if it is determined that none of the objects or people in the user's focal region correlate to the user-specific information, then in step 704, the process returns to tracking the field of view of the user in step 608 in FIG. 8. In one example, when it is determined that none of the objects or people in the user's focal region correlate to the user-specific information, a virtual text message such as "There is currently no object or person of interest in your focal region", may be displayed to the user, via the user's HMD.

In step 714, the one or more objects or people are identified based on the correlation. For example, the people may be identified as the user's friends, John Doe and Sally Doe. In another embodiment, a user's keys may be identified as placed within the scene. In step 716, the user's intent to interact with the identified objects or people is automatically inferred based on the correlation. As discussed above, in one example, the system assigns a binary value to a parameter represented by the one or more identified objects or people upon determining the user's intent to interact with the objects or people. In step 716, the user's intent to interact with the one or more identified objects is stored in the user profile database 470. Step 716 may include automatically inferring intent based on user specific or external factors. Such factors may include, but are not limited to, a user's calendar or schedule information, a user's friend information as stored in a contact database or social graph, geographical positioning information, time of day, and the like. For example, user specific information may indicate that on a Monday, the user is scheduled to attend a meeting and the user's laptop is within the field of view. In accordance with the description provided below in FIG. 15C, the system may highlight the laptop to induce the user to remember to take the laptop with them for the meeting.

FIG. 14B is a flowchart describing another embodiment of a process for determining a user's intent to interact with one or more objects based on the user's expressed intent to interact with one or more objects. In one embodiment, the process described in FIG. 14B is performed, for example, when it is determined that the user is viewing one or more objects in the user's focal region but user's gaze intensity is not long enough (i.e., not greater than the pre-defined threshold, as discussed in step 698 of FIG. 14). In step 720, the user is prompted to specify or express intent to interact with one or more objects in the user's focal region. In one example, the system may display virtual text to the user via the user's HMD device to prompt the user to specify intent to interact with one or more objects. For example, the user may be prompted to specify intent via a user physical action such as a voice input, a keyboard entry, a touch or a gesture. The voice input may be a voice command uttered by the user such as spoken words, whistling, shouts and other utterances. For example, in the exemplary situation of a user trying to find his or her friends at a party, the user may utter a command such as "Help me find my friends!"

Non-vocal sounds such as clapping the hands may also be received from the user. In one example, the voice input or non-vocal sounds may be captured by microphone 110 in the head mounted display shown in FIG. 3 or the microphone 430 in the capture device 423 shown in FIG. 5. Gestures from the user may include facial expressions performed by the user such as a smile, laughter or a cheer. In one example, gestures may be captured by the recognizer engine 454 in the hub computing device 12.

In step 722, it is determined if an intent to interact with one or more objects has been received by the user. If the user's intent has not been received, then in step 704, the process returns to tracking the field of view of the user in step 608 in FIG. 8. If the user's intent has been received (via the physical action), then the user's intent to interact with the one or more objects is determined and the user's specified or expressed intent is stored in the user profile database 470.

Figure 15A:
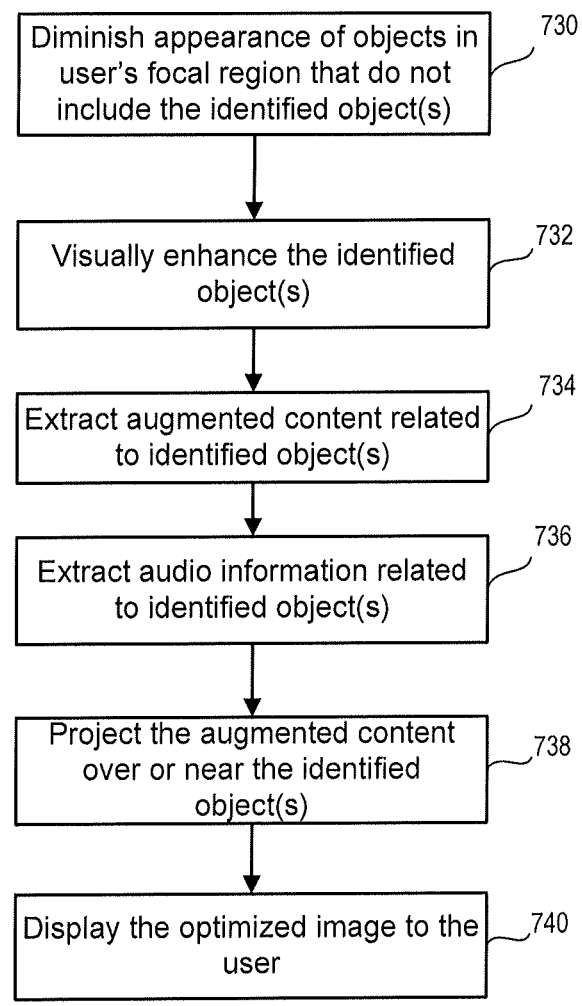
FIG. 15A is a flowchart describing one embodiment of a process for generating and displaying an optimized image to the user based on determining the user's intent to interact with one or more objects.

FIG. 15A is a flowchart describing one embodiment of a process for generating an optimized image and displaying the optimized image to the user based on determining the user's inferred or expressed intent to interact with one or more objects. In one embodiment, generating an optimized image comprises visually enhancing the appearance of objects in the user's focal region that the user intends to interact with and diminishing the appearance of objects that are outside the user's focal region but within the user's field of view that the user does not intend to interact with. For example, the process of FIG. 15A is one example implementation of step 614 of FIG. 8. The steps of FIG. 15A may be performed, under the control of software, by the hub computing device 12 or the processing unit 4.

In step 730, the appearance of objects that are outside the user's focal region but within the user's field of view is diminished. In one embodiment, the opacity filter 114 in the HMD device 2 is utilized to block out or darken the objects that are outside the user's focal region to diminish the appearance of objects that are outside the user's focal region. Thus, a portion of the real-world scene which includes the objects that the user is not interested may be blocked out by the opacity filter 114 from reaching the user's eye, so that the objects that the user intends to interact with in the user's focal region may clearly be seen by the user.

In step 732, the objects that the user intends to interact with in the user's focal region are visually enhanced. In one embodiment, the micro display assembly 120 in the HMD device 2 is utilized to visually enhance the objects in the user's focal region. In one approach, the objects are visually enhanced by highlighting the edges of the objects. In another approach, the objects are visually enhanced by displaying a virtual box, circle or a visual indicator in a region in which the objects are located. Additionally, color may also be used to visually enhance an object.

In step 734, augmented content related to the one or more objects is retrieved. In one example, the augmented content may include user-specific information retrieved from the user profile database 470. In another example, the augmented content may include user-specific information that is retrieved in real time from one or more data sources such as the user's social networking sites, address book, email data, Instant Messaging data, user profiles or other sources on the Internet.

In step 736, audio content related to the identified objects is extracted. Step 736 is optional. For example, if the user is looking at a wall clock in the user's living room and it is determined that the user intends to interact with the wall clock object then audio information about the time may be heard by the user. Or for example, if the user is at a party with his or her friends, and it is determined that the user intends to interact with a specific group of friends at the party, then the user may only hear voices from the specific group of friends.

In step 738, the augmented content is projected over or next to the one or more objects in the user's focal region. In one example, the augmented content is a virtual image including one or more virtual objects or virtual text that is displayed to the user. In another example, the augmented content may include a virtual object such as a menu with one or more choices.

In step 740, an optimized image is displayed to the user via the head mounted display device 2. The optimized image includes an enhanced appearance of objects in the user's focal region, a diminished appearance of objects outside the user's focal region and may optionally include augmented content related to the one or more objects. Exemplary illustrations of the manner of generating an optimized image and displaying the optimized image to a user is shown in FIGS. 16A-C, 17A-D and 18A-C.

In one example, the processing unit 4 sends instructions to display driver 220 of control circuitry 136 for display on micro display 120 of the augmented content. The lens system 122 then projects the optimized image received from the micro display 120 onto the reflecting surface 124 and towards the user's eyes or into the light guide optical element 112 for viewing by the user. In one implementation, the display the user is looking through in the head mounted display device (e.g., the light guide optical element 112) is divided into pixels. The optimized image is displayed in a target location by the pixels. In addition, the opacity filter 114 may be used to prevent unrealistic visual effects. For example, the opacity filter 114 can modify light to pixels in the light guide optical element 112 so that a background virtual object in the optimized image is not seen through a foreground virtual object.

Figure 15B:
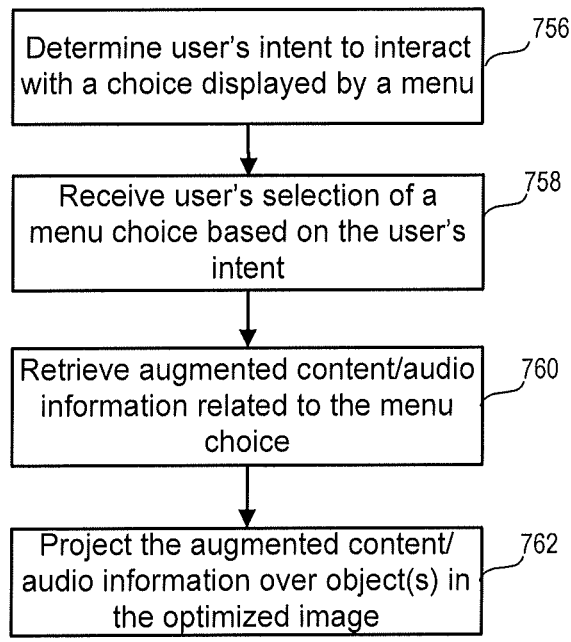
FIG. 15B is a flowchart describing one embodiment of a process for displaying additional augmented content to a user, based on determining the user's intent to interact with augmented content displayed in an optimized image.

FIG. 15B is a flowchart describing one embodiment of a process for displaying additional augmented content to a user, based on determining the user's inferred or expressed intent to interact with augmented content displayed in an optimized image. In one example, upon displaying an optimized image as described in step 740 of FIG. 15A, the user may be presented with additional augmented information. For example, consider the situation in which a user looks at a basket of apples placed on a table in the user's living room and it is determined that user intends to interact with the basket of apples. An optimized image that visually enhances the appearance of the basket of apples is displayed to the user. Assume that the optimized image also projects augmented content that includes a virtual object such as a menu of choices to the user.

In step 756, the user's intent to interact with a choice displayed by the menu is determined. The user's intent may be determined as discussed by the process described in FIG. 14. In step 760, the user's selection of a choice in the menu is received, based on the user's intent. In step 762, augmented content and optionally audio information related to the menu choice is retrieved. In step 762, the augmented content is projected over or next to the visually enhanced objects in the optimized image. An exemplary illustration of the manner of displaying an optimized image that includes a menu of choices and determining the user's intent to interact with a menu choice is shown in FIGS. 17A-D.

Figure 15C:
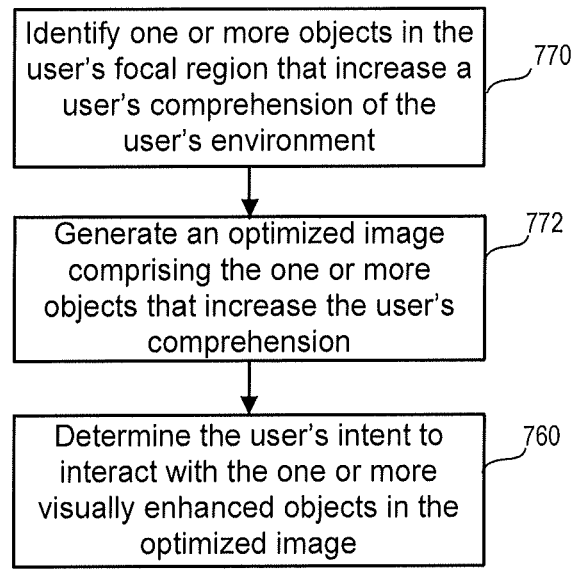
FIG. 15C describes a process by which a user's comprehension of visualized information in the user's environment is enhanced.

In another embodiment of the disclosed technology, the user's comprehension of visualized information in the user's environment is increased by automatically enhancing certain objects in the user's environment. FIG. 15C describes a process by which a user's comprehension of visualized information in the user's environment is increased. In step 770, one or more objects in the user's focal region that increase a user's comprehension of the user's environment are identified. In one example, the objects that increase the user's comprehension may be identified by gathering information about the user's environment, in real time. For example, the information may include emergency signs in the user's environment, or the presence of hazardous objects or sharp objects in the user's environment. In another example, the objects that increase the user's comprehension may be identified based on user-specific information related to the user as noted above with respect to FIG. 14B. For example, user-specific information related to the user may include a reminder that specifies that it is time for the user to have a snack when an object such as a basket of apples is identified in the user's living room.

In step 772, an optimized image comprising the one or more objects that increase the user's comprehension is generated. In one embodiment, the optimized image visually enhances the appearance of the one or more objects that increase the user's comprehension in the user's environment. In one approach, the objects are visually enhanced by highlighting the edges of the objects, displaying a virtual box, circle or a visual indicator in a region in which the objects are located.

In step 774, the user's intent to interact with the one or more visually enhanced objects in the optimized image may be determined. In one example, the user's intent may be determined by inferring the user's intent to interact with one or more of the visually enhanced objects (as discussed in FIG. 14 or FIG. 14A). In another example, the user's intent may also be determined based on the user's expressed intent to interact with one or more of the visually enhanced objects (as discussed in FIG. 14B).

Figure 16A:
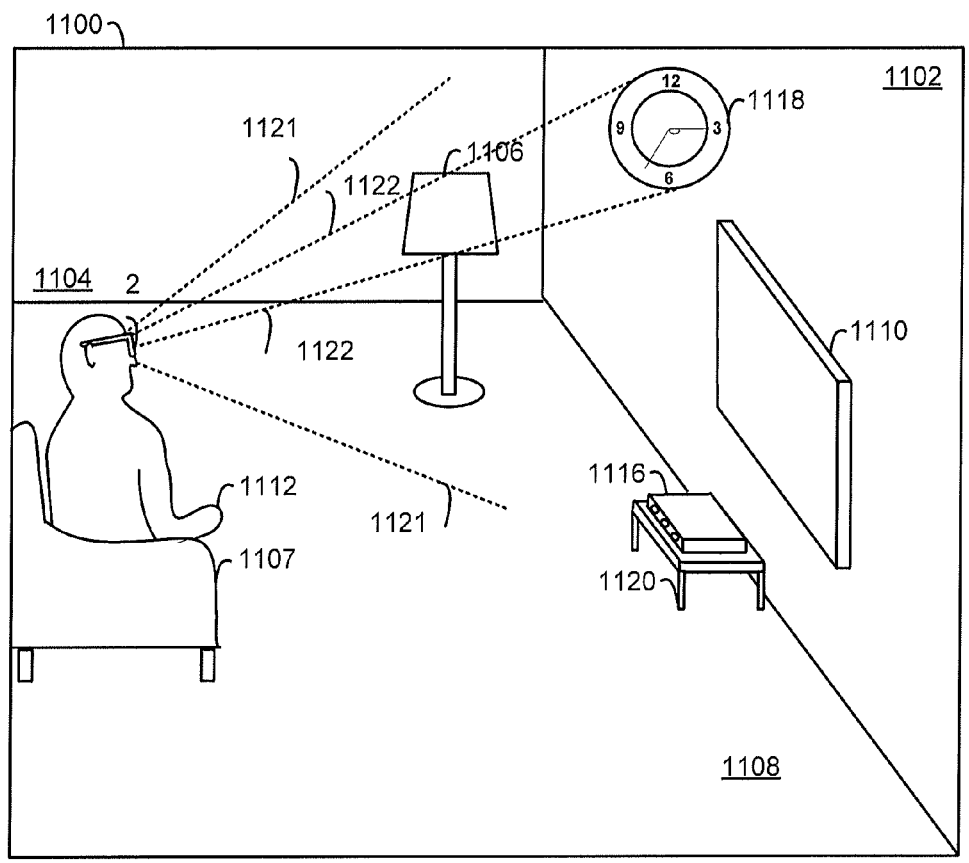
FIGS. 16A-C depict one embodiment of a user's interaction with one or more objects in the user's environment and the generation of an optimized image based on the user's interaction.
Figure 16B:
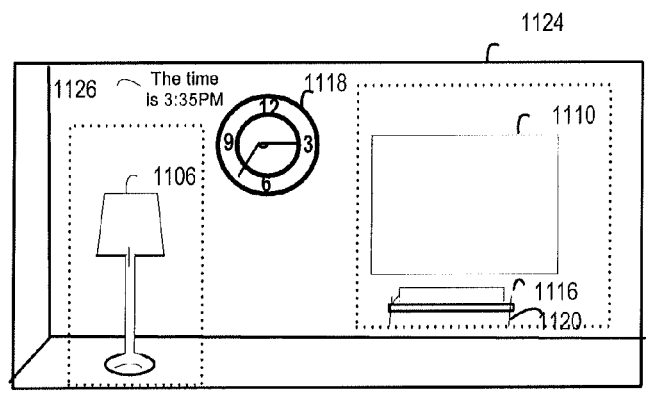
Figure 16C:
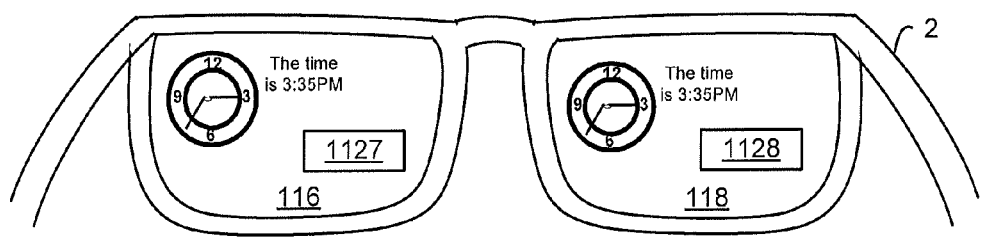

FIGS. 16A-C depict one embodiment of a user's interaction with one or more objects in the user's environment and the generation of an optimized image based on the user's interaction. FIG. 16A depicts an environment in which a user views one or more objects in a room 1100 using a HMD device 2. The room 1100 includes a front wall 1102, side wall 1104 and floor 1108, and example furniture such as a lamp 1106, a chair 1107, a wall clock 1118 and a table 1120. A video display screen 1110 is mounted to the wall 1102, in this example, and the hub 1116 rests on the table 1120. In an exemplary situation, user 1112 looks at an object such as the wall clock 1118 placed on the front wall 1102, via HMD device 2. 1121 represents the field of view of the user and 1122 represents the user's focal region.

FIG. 16B depicts an optimized image generated by the camera of the HMD device of FIG. 16A, upon determining the user's intent to interact with the wall clock object 1118. In one embodiment, the user's intent may be determined as discussed by the process described in FIG. 14. As illustrated in FIG. 16B, the optimized image 1124 includes an enhanced appearance of the wall clock object 1118 in the user's focal region and a diminished appearance of the lamp 1106, the display screen 1110, the hub 1116 and the table 1120 which are outside the user's focal region, but within the user's field of view. In the exemplary illustration, the wall clock object 1118 has been highlighted to enhance its appearance. The dotted lines around the objects 1106, 1110, 1116 and 1120 indicate their diminished appearance. In addition, the optimized image displays augmented content 1126 that shows the time of day in digital format next to the wall clock object 1118. In one example, audio information about the time of day may also be heard by the user.

FIG. 16C depicts the optimized image of FIG. 16B as seen by a user via a HMD device. The optimized image is provided by each of the lenses 116 and 118, respectively, of the HMD device 2. The open regions 1127 and 1128 indicate the locations where light from the display screen enters the user's eyes.

Figure 17A:
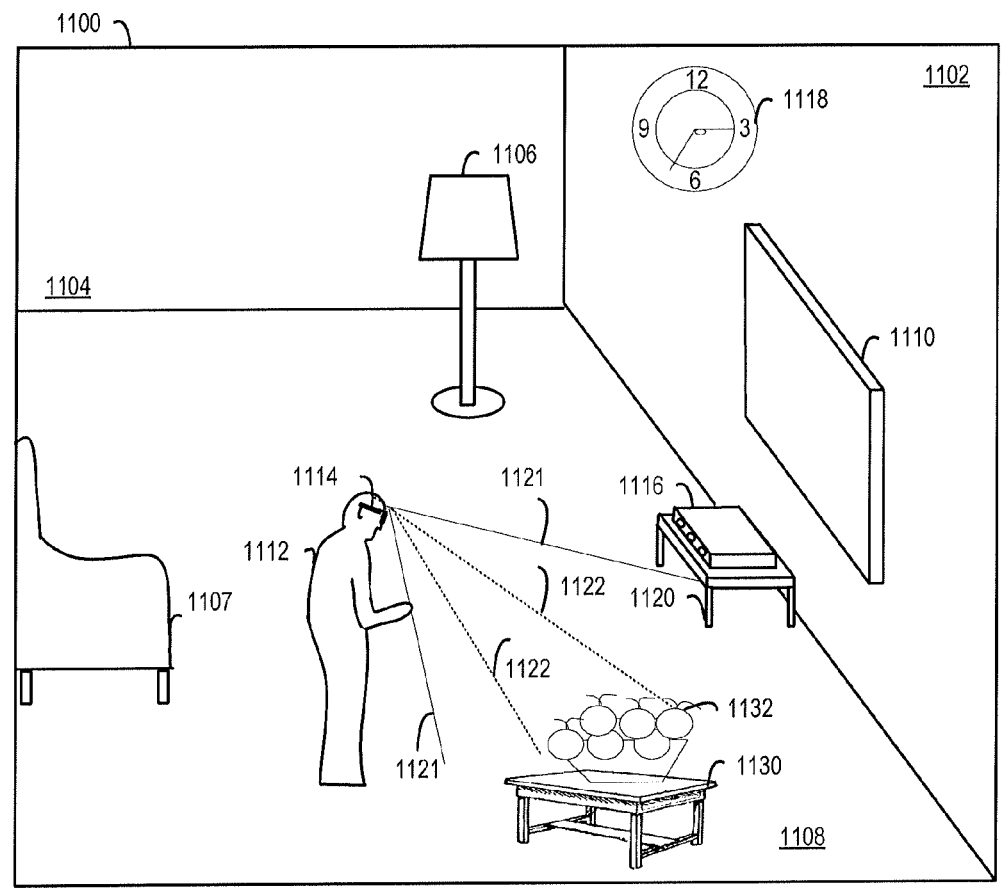
FIGS. 17A-D depict another embodiment of a user's interaction with one or more objects in the user's environment and the generation of an optimized image based on the user's interaction.

FIGS. 17A-D depict another embodiment of a user's interaction with one or more objects in the user's environment and the generation of an optimized image based on the user's interaction. FIG. 17A depicts an environment (such as, as shown in FIG. 16A) in which a user 1112 views one or more objects in a room 1100 using a HMD device 2. In the illustration of FIG. 17A, user 1112 looks at a basket of apples 1132 that is placed on a table 1130. 1121 represents the field of view of the user and 1122 represents the user's focal region.

Figure 17B:
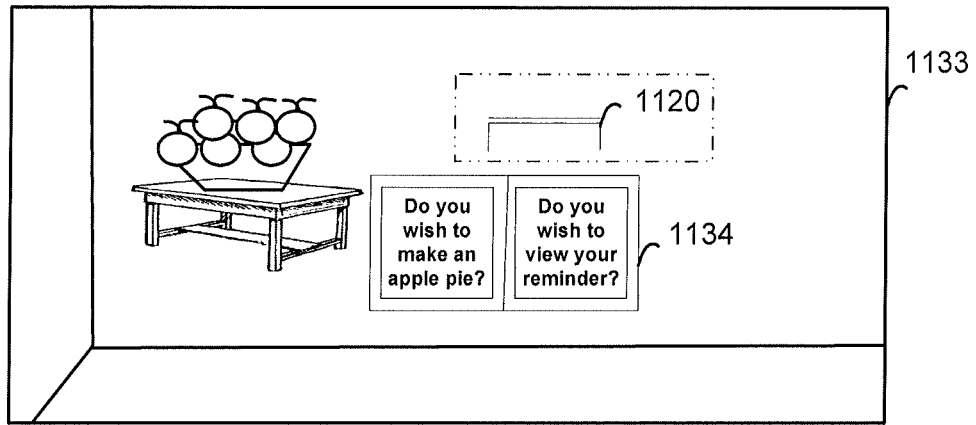

FIG. 17B depicts an optimized image generated by the camera of the HMD device of FIG. 17A, upon determining the user's intent to interact with the basket of apples 1132. In one embodiment, the user's intent may be determined as discussed by the process described in FIG. 14. The optimized image 1133 includes an enhanced appearance of the basket of apples 1132 in the user's focal region and a diminished appearance of the table 1120 which is outside the user's focal region, but within the user's field of view. In another embodiment, the appearance of the basket of apples may be automatically enhanced based on determining that the basket of apples increases the user's comprehension of the user's environment. An optimized image that includes an enhanced appearance of the basket of apples 1132 in the user's focal region may be generated, in accordance with the process described in FIG. 15C. The optimized image 1133 may also display augmented content 1134. In the illustrated example, the augmented content 1134 is a menu with choices, "Do you wish to make an apple pie?" or "Do you wish to view your reminder?" that is displayed to the user 1112.

Figure 17C:
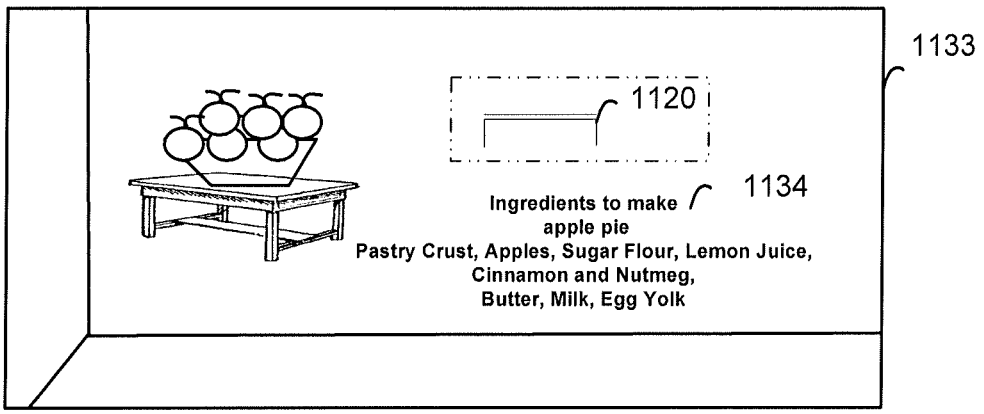

FIG. 17C illustrates another optimized image that is displayed to the user upon determining the user's intent to interact with one of the choices displayed in the menu. In one embodiment, the user's intent may be determined as discussed by the process described in FIG. 14. In the illustrated example, the optimized image 1133 displays augmented content 1134 that includes ingredients to make an apple pie, when it is determined that the user intends to interact with the menu choice, "Do you wish to make an apple pie?"

Figure 17D:
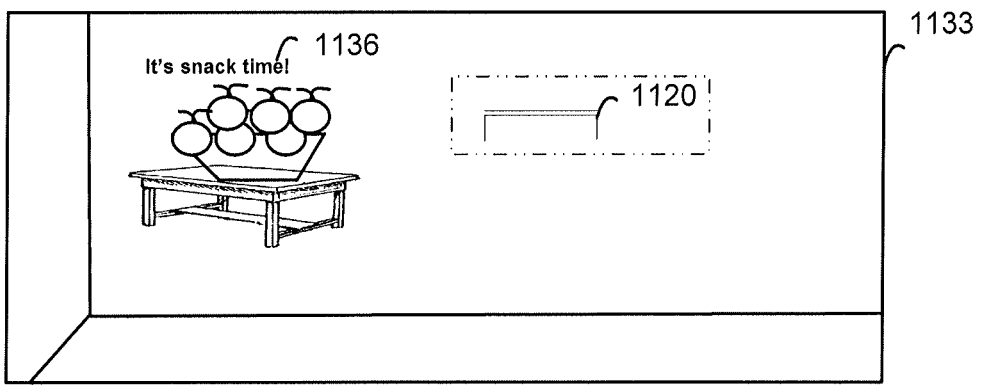

FIG. 17D illustrates an optimized image that is displayed to the user upon determining the user's intent to interact with one of the choices displayed in the menu. In the illustrated example, the optimized image 1133 displays augmented content 1136 that includes a reminder to the user that it is time for the user to have his or her snack, when it is determined that the user intends to interact with the menu choice, "Do you wish to view your reminder?"

Figure 18A:
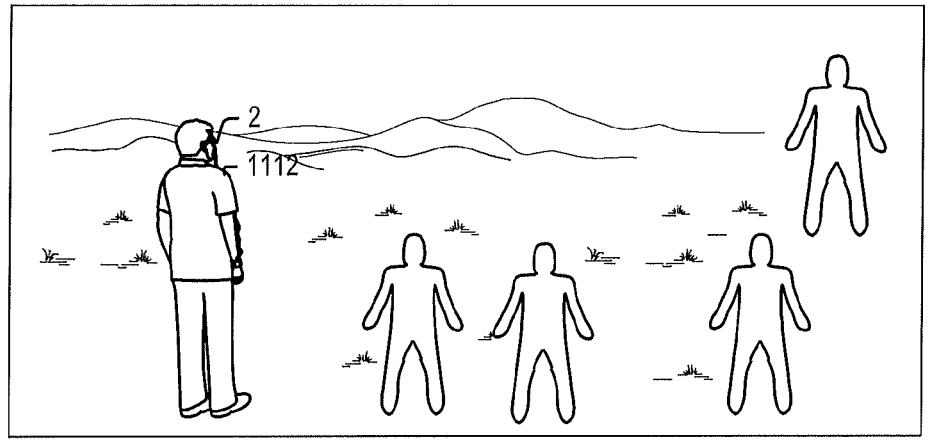
FIGS. 18A-C depict another embodiment of a user's interaction with one or more objects in the user's environment and the generation of an optimized image based on the user's interaction.
Figure 18B:
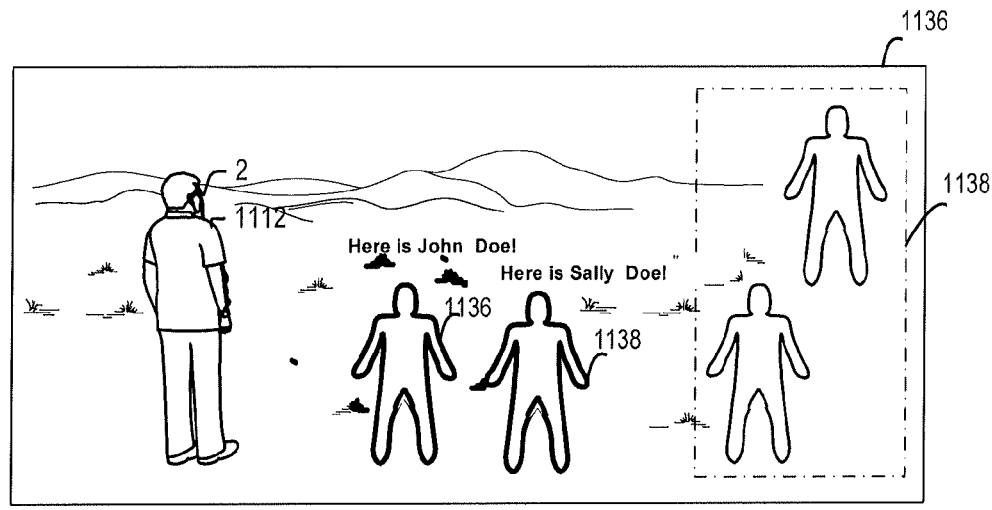
Figure 18C:
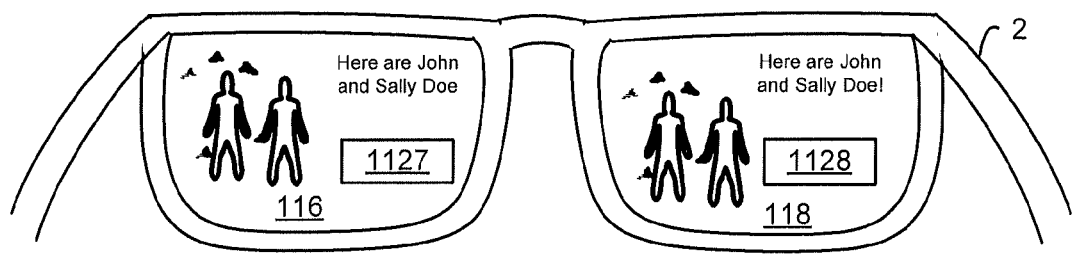

FIGS. 18A-C depict another embodiment of a user's interaction with one or more objects in the user's environment and the generation of an optimized image based on the user's interaction. FIG. 18A depicts an environment in which a user 1112 is meeting a number of people at a get together taking place in the user's backyard. In the exemplary situation illustrated in FIG. 18A, user 1112 may have less than normal vision and may not be able to clearly see all the people in the get together via HMD device 2. Or, the user may not wish to interact with the people in the get together straight away as the user does not remember their names.

FIG. 18B illustrates an optimized image that is displayed to the user by automatically determining the user's intent to interact with one or more people in the get together. In one approach, and as discussed in FIG. 14A, the user's intent to interact with one or more people in the user's focal region may automatically be inferred by accessing user-specific information related to the user. In another approach, and as discussed in FIG. 14B, the user's intent to interact with one or more people in the user's focal region may also be determined by receiving a voice command from the user such as, "Help me find my friends!" The optimized image 1136 includes an enhanced appearance of the user's friends John Doe 1136 and Sally Doe 1138 and a diminished appearance of the other people 1138 in the party, who are outside the user's focal region, but within the user's field of view. The optimized image 1133 also displays augmented content that identifies the user's friends John Doe 1136 and Sally Doe 1138 with a virtual text message such as "Here is John Doe!" and "Here is Sally Doe!", respectively. A determination of individuals a user may intend to interact with may be performed via an analysis of the user's social graph (stored in the user-specific information, or by reference to friends of the user (however determined) who may be seeking the user at the same time.

FIG. 18C depicts the optimized image of FIG. 18B as seen by a user via a HMD device. The optimized image is provided by each of the lenses 116 and 118, respectively, of the HMD device 2. The open regions 1127 and 1128 indicate the locations where light from the video display screen enters the user's eyes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for generating an optimized image based on user intent in an augmented reality system, the method comprising:
   determining a plurality of real world objects in a scene in a field of view of a see-through display device;
   determining the field of view of a user through the see-through display device in the scene and determining a focal region of the user within the field of view;
   determining the user's intent to interact with one or more objects in the focal region of the user;
   generating an optimized image, based on the user's intent; and
   displaying the optimized image to the user, the optimized image comprising a visual enhancement of at least one of the plurality of real world objects in the focal region of the user, and a simultaneous diminished appearance of one or more of the plurality of objects that are outside the focal region of the user but within the field of view of the user through the see-through display device.

2. The method of claim 1, wherein the step of determining one or more objects of interest includes creating a three dimensional model of the scene and further comprises:
   segmenting the three dimensional model into one or more of the objects comprising the scene and identifying the one or more objects in the scene.

3. The method of claim 2, wherein the simultaneous diminished appearance comprises:
   An increased opacity in the field of view containing said remaining plurality of real world objects.

4. The method of claim 1, wherein:
   the focal region of the user is a Panum's fusional area of eyes of the user.

5. The method of claim 1, wherein determining the user's intent to interact with one or more objects in the focal region of the user further comprises:
   detecting eye movement patterns of the user in the focal region of the user;
   determining an intensity of gaze of the user on one or more objects being viewed by the user in the focal region of the user; and
   inferring the user's intent to interact with the one or more objects in the focal region of the user, based on the eye movement patterns and the intensity of the user's gaze.

6. The method of claim 5, wherein determining the user's intent to interact with one or more objects in the focal region of the user further comprises:
   where said inferring is not determinative of the user's intent to interact,
   accessing user-specific information related to the user;
   correlating one or more of the objects in the focal region of the user to the user-specific information; and
   automatically inferring the user's intent to interact with the one or more objects in the focal region of the user, based on the correlation.

7. The method of claim 6, wherein determining the user's intent to interact with one or more objects in the focal region of the user further comprises:
   where said automatically inferring is not determinative of the user's intent to interact,
   prompting the user to specify intent to interact with one or more of the objects in the focal region of the user;
   receiving the user's intent via at least one of a user physical action; and
   determining the user's intent to interact with the one or more objects based on the user physical action.

8. The method of claim 1, wherein generating the optimized image further comprises:
   retrieving at least one of augmented content or audio information related to the one or more objects in the focal region of the user; and
   projecting the augmented content or the audio information over or next to the one or more objects in the focal region of the user.

9. The method of claim 8, wherein visually enhancing the appearance of the one or more objects further comprises at least one of highlighting edges of the one or more objects or displaying a virtual box, a circle or a visual indicator in a region in which the one or more objects are located.

10. The method of claim 1 wherein the step of determining one or more objects of interest includes at least one of:
   detecting an emitted signal from an object to the see-through display device; and
   determining distanced of possible objects from the see-through display device using a distance detection technology.

11. The method of claim 8, further comprising displaying additional augmented content to a user, based on determining the user's intent to interact with the augmented content displayed in the optimized image, wherein displaying the additional augmented content further comprises displaying a menu associated with the optimized image:
   determining the user's intent to interact with one or more of choices displayed by the menu;
   receiving a selection of a choice in the menu, based on the user's intent;
   retrieving additional augmented content related to the choice; and
   projecting the additional augmented content in the optimized image to the user.

12. An apparatus including a see-through display and a capture device, the apparatus including one or more processor readable storage devices having processor readable code embodied on said one or more processor readable storage devices, the processor readable code for programming one or more processors to perform a method comprising:
   scanning a scene using the capture device to determine a plurality of real world objects of interest in the scene;
   determining a field of view of the see-through display device in the scene, and the real world objects within the field of view;
   determining a focal region of a user within the field of view;
   identifying at least one of the plurality of real world objects in the focal region and a remaining plurality of said plurality of real world objects outside the focal region in an environment;
   generating an optimized image in the field of view, the optimized image comprising a visual enhancement of the at least one of the plurality real world objects in the focal region of the user, and a simultaneous diminished appearance of any remaining plurality of real world objects that are outside the focal region of the user; and
   displaying the optimized image in the field of view of the see-through display device.

13. One or more processor readable storage devices according to claim 12, wherein identifying the one or more objects in the focal region of the user that enhance user comprehension of the environment comprises gathering information about the environment, in real time.

14. One or more processor readable storage devices according to claim 12, wherein identifying the one or more objects in the focal region is based on user-specific information related to the user.

15. One or more processor readable storage devices according to claim 12, wherein generating the optimized image further comprises:
   visually enhancing the appearance of the one or more objects that enhance comprehension in the environment and increasing opacity in the field of view containing said remaining pluralist of real world objects.

16. One or more processor readable storage devices according to claim 15, wherein visually enhancing the appearance of the one or more objects further comprises at least one of highlighting edges of the one or more objects or displaying a virtual box, a circle or a visual indicator in a region in which the one or more objects are located.

17. One or more processor readable storage devices according to claim 16, further comprising:

determining user intent to interact with the at least one of the plurality of real world objects in the optimized image, wherein determining user intent comprises:

determining an intensity of gaze of the user on the visual enhancement;

accessing user-specific information related to the user; and determining the user's intent to interact with the visual enhancement based on at least one of the intensity of gaze and the user-specific information.

18. An augmented reality system comprising:

a see-through display device having a field of view;

a micro display assembly attached to the see-through display device adapted to display an optimized image to a user, based on determining user intent to interact with one or more objects in a field of view of the device;

a processor communicatively coupled to the micro display assembly;

a memory accessible by the processor and storing software and data;

under control of software, the processor determines a plurality of real world objects in the field of view, the processor determines a user intent to interact with one of the plurality real world objects in a focal region of the user in the field of view by first determining an intensity of gaze of the user on the real world object through the see-through display device and if said intensity does not determine user intent, then accessing user-specific information related to the user, and determining the user's intent to interact based a correlation between the real world objects in field of view and the user-specific information, and the processor generates an optimized image of the one of the plurality of real world objects in the field of view, the optimized image comprising a visual enhancement of the one of the plurality of real world objects in the focal region, and a simultaneous diminished appearance of any of the plurality of real world objects that are outside the focal region of the user but within the field of view.

19. The augmented reality system of claim 18, wherein the processor determines the user's intent to interact with one or more objects in the focal region of the user based on at least one of eye movement patterns of the user, the intensity of the user's gaze and user-specific information related to the user.

20. The augmented reality system of claim 18, wherein the micro display assembly highlights the one or more objects that the user intends to interact with, in the optimized image and increases opacity in the field of view containing said remaining plurality of real world objects.

* * * * *